United States Patent [19]
Fushimi

[11] Patent Number: 6,035,296
[45] Date of Patent: *Mar. 7, 2000

[54] SORTING METHOD, SORT PROCESSING DEVICE AND DATA PROCESSING APPARATUS

[75] Inventor: Shinya Fushimi, Kanagawa, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,187

[22] Filed: Mar. 21, 1996

[30] Foreign Application Priority Data

Mar. 20, 1995 [JP] Japan .................................... 7-072551

[51] Int. Cl.[7] .................................................. G06F 17/30
[52] U.S. Cl. .............................................................. 707/7
[58] Field of Search ................................... 395/607, 610, 395/671, 672–677, 800.08; 707/7

[56] References Cited

U.S. PATENT DOCUMENTS

| | | | |
|---|---|---|---|
| 4,209,845 | 6/1980 | Berger et al. | 707/7 |
| 4,514,826 | 4/1985 | Iwata et al. | 707/7 |
| 4,779,192 | 10/1988 | Torii et al. | 395/800.08 |
| 4,890,220 | 12/1989 | Nakagawa et al. | 395/800.08 |
| 4,962,451 | 10/1990 | Case et al. | 707/7 |
| 5,079,736 | 1/1992 | Kitsuregawa et al. | 395/600 |
| 5,185,888 | 2/1993 | Tanaka et al. | 707/7 |
| 5,210,870 | 5/1993 | Baum et al. | 395/600 |
| 5,307,485 | 4/1994 | Bordonaro et al. | 707/7 |
| 5,341,507 | 8/1994 | Terada et al. | 395/800 |
| 5,392,442 | 2/1995 | Komori et al. | 395/800 |
| 5,404,558 | 4/1995 | Okamoto | 395/800 |
| 5,410,689 | 4/1995 | Togo et al. | 707/7 |
| 5,452,464 | 9/1995 | Nomura et al. | 395/775 |
| 5,535,384 | 7/1996 | Kasahara | 395/600 |
| 5,590,355 | 12/1996 | Shichiku et al. | 395/800 |
| 5,727,200 | 3/1998 | Narita et al. | 707/7 |
| 5,857,186 | 1/1999 | Narita et al. | 707/7 |

FOREIGN PATENT DOCUMENTS

| | | |
|---|---|---|
| 0165915 | 12/1985 | European Pat. Off. . |
| 0502680 | 9/1992 | European Pat. Off. . |
| 63-086043 | 4/1988 | Japan . |
| 63-86043 | 4/1988 | Japan . |

OTHER PUBLICATIONS

"Proceedings of the 1993 ACM Sigmod International Conference on Management of Data", vol. 22, Jun. 1993. "Greo: A Commercial Database Processor Based on a Pipelined Hardware Sorter".

Hans Joachim Muschenborn "OS/2 System and Network Programming", 1994, Tewi Verlag, Germany, pp. 418–419 (no translation).

IBM Sort—Sort Information by Letter or Number, no date.

S. Fushimi & M. Kitsuregawa "Greo: A Commerical Database Processor Based on a Pipelined Hardware Sorter" Sigmod Record Jun. 22, 1993, pp. 449–452.

P. Heidelberger, et al "Parallel Quicksort Using Fetch-and-Add", IEEE Transactions on Computers, Jan. 1990, pp. 133–138.

Michael J. Quinn "Parallel Sorting Algorithms for Tightly Coupled Multiprocessors" Parallel Computing Mar. 6, 1988, pp. 349–357.

Harvey M. Deithel "An Introduction to Operating Systems" World Student Series Edition, 1990, pp. 287–303.

*Primary Examiner*—Maria N. Vonbuhr
*Attorney, Agent, or Firm*—Leydig, Voit & Maye, Ltd.

[57] ABSTRACT

A controller of a data processing device is comprised of a multiprocessing control unit, an input-data processing control unit, and an output-data processing control unit so as to effect multiprocessing control which takes into consideration a time lag due to a sort processing device. In addition, control and the like for changing over jobs in accordance with initialization data inputted is effected by a control unit of a sort processor in the sort processing device of the data processing apparatus.

20 Claims, 20 Drawing Sheets

FIG. 3

| ADDRESS | COMMAND | SUBTRAHEND |
|---|---|---|
| 0 | COMMAND FOR RESUMING CHANGE IN DEGREE OF MULTIPROCESSING: restart | DEGREE OF MULTIPROCESSING (1 OR 2) |
| 1, 2, 3, 4 | PROCESSING START COMMAND: open | PROCESSING TYPE (SORT, OTHER THAN SORT) INCIDENTAL DATABASE PROCESSING CONDITION FOR DATA SELECTION PROCEDURE FOR CONVERTING DATA FORMAT PROCEDURE FOR TOTALIZATION |
| | DATA TRANSFER COMMAND: xfer | DATA BUFFER ADDRESS, DATA LENGTH |
| | PROCESSING END COMMAND: close ORDER | END-STATE STORAGE AREA ADDRESS |

INTERFACE FOR INPUT/OUTPUT COMMANDS OF DATA PROCESSING APPARATUS

INPUT/OUTPUT COMMANDS, JOBS AND JOB STEPS

FIG. 5

| | WRITE SIDE JOB | STATE OF SORT PROCESSING | WRITE SIDE JOB |
|---|---|---|---|
| S20 | INITIAL STATE | 61, 62, 63 | INITIAL STATE |
| S21 | JOB 0 WRITE JOB STEP 1 | | NONE |
| S22 | JOB 0 WRITE JOB STEP 1 COMPLETED STATE | | INITIAL STATE |
| S23 | JOB 1 WRITE JOB STEP 1 | | JOB 0 READ JOB STEP 1 |
| S24 | JOB 1 WRITE JOB STEP 1 COMPLETED STATE | | JOB 0 READ JOB STEP 1 COMPLETED STATE |
| S25 | JOB 0 WRITE JOB STEP 2 | | JOB 1 READ JOB STEP 1 |
| S26 | JOB 0 WRITE JOB STEP 2 COMPLETED STATE | | JOB 1 READ JOB STEP 1 COMPLETED STATE |

64: DATA OF JOB 0    65: DATA OF JOB 1

JOBS AND JOB STEPS
(CASE WHERE SORT PROCESSING DEVICE IS USED)

JOBS AND JOB STEPS
(CASE WHERE SORT PROCESSING DEVICE IS NOT USED)

OPERATION OF INPUT-DATA PROCESSING CONTROL UNIT

OPERATION OF OUTPUT-DATA PROCESSING CONTROL UNIT

EXAMPLE OF MULTIPROCESSING CONTROL

SORT PROCESSING
DURING ONE DEGREE
OF MULTIPROCESSING

PROCESSING OTHER THAN SORT
PROCESSING DURING ONE
DEGREE OF MULTIPROCESSING

SORT PROCESSING
DURING TWO DEGREES
OF MULTIPROCESSING

PROCESSING OTHER THAN SORT
PROCESSING DURING TWO
DEGREES OF MULTIPROCESSING

▨ : USED BY SHARED MEMORY
▧ : USED BY SORT PROCESSING DEVICE

SORTING METHOD, SORT PROCESSING DEVICE AND DATA PROCESSING APPARATUS

BACKGROUND OF THE INVENTION

1. Field of the Invention

The present invention relates to a sort processing device for sorting a large volume of data at high speed, a sorting method using the sort processing device, and a data processing apparatus for effecting data retrieval and the like.

2. Description of the Related Art

FIG. 18 shows a conventional data processing apparatus shown in "Information Processing" Vol. 33, No. 12, pp. 1416–1423. Reference numeral 1 denotes a data processing apparatus, and 2 denotes a controller for controlling a database processing device 3 by interpreting a command sent thereto from a CPU 7. Numeral 3 denotes the database processing device for effecting database processing with respect to data stored in a disk device 8, a main storage device 6, and the like, and numeral 4 denotes a sort processing device for effecting sort processing in response to an instruction from the database processing device. The controller 2, the database processing device 3, and the sort processing device 4 are located in the data processing apparatus 1. Numeral 5 denotes a bus of a host computer 9 for connecting the data processing apparatus 1, the main storage device 6, the CPU 7, the disk device 8, and the like. Numeral 6 denotes the main storage device of the host computer, 7 denotes the CPU of the host computer, 8 denotes the disk device for storing data in the host computer, and 9 denotes the overall host computer.

Next, a description will be given of the operation. If a request for data processing is generated in the host computer 9, the CPU 7 of the host computer 9 consecutively fetches data from the disk device 8 in which object data are stored, and continuously transmits the same to the data processing apparatus 1 via the bus 5. At this time, the main storage device 6 of the host computer 9 is used as an input/output buffer area, as necessary. When data are inputted to the data processing apparatus 1, the data processing apparatus 1 effects processing by the database processing device 3 and sort processing by the sort processing device 4, and returns the results to the CPU 7 again via the bus 5. The CPU 7 stores the returned result data in the disk device 8 in the same way as during inputting. The inputting of data to the data processing apparatus 1 and the outputting of the result data from the data processing apparatus 1 are executed in parallel by the controller 2.

Next, a detailed description will be given of the operation of the database processing device 3. With respect to the data inputted to the database processing device 3 from the controller 2, the database processing device 3 executes database processing other than sort processing, such as the selection of data, format conversion, and merge. There are cases where the database processing device 3 is realized by special-purpose hardware, or it is realized by the use of one or a plurality of general-purpose microprocessors. Depending on the contents of the instruction from the CPU 7, the database processing device 3 effects sort processing by controlling the sort processing device 4 when sort processing is necessary. Generally, prior to sort processing the database processing device 3 effects the selection of data, format conversion, and the like, or effects totalization processing and the like after sort processing. Meanwhile, if the sort processing is not necessary, the database processing device 3 alone effects the selection processing of data and the like, and returns the results to the CPU 7 via the controller 2. In addition, at this juncture, as shown in, for example, Japanese Patent Application Laid-Open No. 63-86043, the storage device of the sort processing device 4 is shared, the sort processing device is stopped, and its storage device is used as the storage device of the database processing device 3 so as to be used as a large-capacity buffer storage device in processing such as the merging, combination, and the like of data.

An example of the configuration of the above-described database processing device is shown in FIG. 19. In FIG. 19, the same reference numerals as those shown FIG. 18 denote identical or corresponding parts. Numerals 34 and 35 denote general-purpose microprocessors, and numerals 36 and 37 denote main storage memories which are respectively connected to the microprocessors 34 and 35. Numeral 38 denotes a bus for connecting the two general-purpose microprocessors 34 and 35, the controller 2, and the sort processing device 4; numeral 31 denotes a bus for inputting data to the sort processing device 4; numeral 32 denotes a bus for outputting the data from the sort processing device 4; and numeral 33 denotes a bus for accessing the shared storage device in the sort processing device 4. Hereafter, a description will be given of the operation of the database processing device 3 separately with respect to a case where the designated data processing uses the sort processing device 4, and a case where it does not.

In the case where the designated processing uses the sort processing device 4, as for the microprocessors 34 and 35, the microprocessor 34, for instance, is assigned to data selection processing with respect to input data. The microprocessor 34 continuously receives the data which are sent thereto from the controller 2 via the bus 38, fetches only necessary data by using its main storage memory 36, and sends the necessary data consecutively to the sort processing device 4 via the bus 31. The sort processing device 4 continuously receives these data, rearranges them and consecutively sends the results back to the microprocessor 35 via the bus 32. Upon receiving the results, the microprocessor 35 effects, for example, the format conversion, aggregate function, and the like of data by using the main storage memory 37, and sends the results back to the controller 2 via the bus 38.

In the case where the designated processing does not use the sort processing device 4, the input data processing and the output data processing are respectively allocated to the microprocessors 34 and 35. In this case, since the sort processing device 4 is not used, its operation is stopped, and the storage device of the sort processing device 4 is alternatively used as the main storage of the microprocessors 34 and 35 via the bus 33. Namely, the microprocessors 34 and 35 utilize as their shared storage device a part of the storage device which the sort processing device 4 has, in addition to the main storage memories 36 and 37 which the microprocessors 34 and 35 respectively have. The data which are sent to this storage device are partially stored, the number of inputs to and outputs from the controller 2 can be reduced, thereby making it possible to improve the processing speed. For example, processing for merging groups of data stored in a plurality of files can be executed such that the microprocessor 34 temporarily stores in the area of the shared storage device in the sort processing device 4 the data of the group of files received from the controller 2 while the data are being consecutively classified in correspondence with the files, and, at the same time, the microprocessor 35 merges in parallel the data of the respective files located in that area.

Next, a description will be given in detail of the operation of the sort processing device 4. Data strings sent from the CPU 7 via the database processing device 3 are continuously inputted to the sort processing device 4, and are rearranged in a designated order, and the results are returned to the database processing device 3 again. This process is shown in FIG. 20 described in the aforementioned "Information Processing." FIG. 20 is a diagram illustrating the internal configuration of the sort processing device 4. In FIG. 20, the same reference numerals as those shown in FIG. 19 denote identical or corresponding portions. Reference numeral 41 denotes a first-stage sort processor for effecting sort processing first with respect to the data inputted through the bus 31; numeral 42 denotes a second-stage sort processor for effecting sort processing with respect to the output data sorted by the first-stage sort processor; and numerals 43 and 44 denote a third-stage sort processor and a fourth-stage sort processor each adapted to effect sort processing with respect to the output data from the respective preceding-stage sort processor. The output data from the sort processor in the fourth stage, i.e., a final stage, are outputted to the microprocessor 34 or 35 via the bus 32. Although the four sort processors 41 to 44 are illustrated here to simplify the description, the number of the sort processors may be increased or decreased, as required. Reference numerals 45 to 48 denote shared storage devices which are respectively connected to the sort processors 41 to 44. The storage capacities of the shared storage devices 45 to 48 vary in correspondence with the sort processors 41 to 44 connected thereto. For example, the storage capacity of the shared storage device connected to an ith-stage sort processor has a capacity calculated by 2 to the (i−1g)th power.

Next, a description will be given of the details of sort processing by the sort processing device 4. FIG. 21 is a diagram illustrating the contents of data inputted to the respective sort processors as well as their input timings. Numeral 49a denotes a data string inputted to the first-stage sort processor; 49b, a data string inputted to the second-stage sort processor; 49c, a data string inputted to the third-stage sort processor; and 49d, a data string inputted to the fourth-stage sort processor.

Now, a case is considered in which the data 8, 2, 1, 3, 5, 7, 6, 4, are consecutively inputted to the sort processing device 4, and sorting is carried out in descending order. First, the leading sort processor 41 in the first stage fetches the inputted data in two's, rearranges them, and sends them to the sort processor 42 in a subsequent stage. The data inputted in two's to the subsequent-stage sort processor are 82, 31, 75, 74, Here, the order of the data "1" and 3" sent from the preceding-stage sort processor 41 is reversed, and the data are outputted as a combination of two pieces of data sorted in the reverse order as "31." The data which are thus sorted in two's are inputted to the second-stage sort processor 42, which fetches them in two sets and merges them, and sends data strings sorted in four's to the subsequent stage. The result is 8321, 7654, Here, if, for example, "82 and "31" are merged, the result is "8321." The data thus sorted in four's are inputted to the third-stage sort processor 43, which fetches them in two sets and merges them, and sends data strings sorted in eight's to the subsequent stage. The result is

87654321,

The fourth-stage sort processor 44 and subsequent sort processors also effect similar processing.

Here, as shown in FIG. 21, each of the sort processors 41 to 44 is capable of starting processing before the preceding-stage sort processor completes all the processing. Consequently, it can be seen that if the data are inputted continuously, the sorted results are outputted in parallel with the data input with a slight time lag.

For example, a description will be given of the start of processing by the second-stage sort processor 42. The first-stage sort processor 41 receives "8" in Step S1 and "2" in Step S2. Then, the first-stage sort processor 41 compares "8" and "2" in Step S3, and outputs "8" which is a greater numerical value, and receives a new numerical value "1." Then, in Step S4, the first-stage sort processor 41 compares "2" and "1" which are presently stored, and outputs "2," and receives a new numerical value "3."

Meanwhile, the second-stage sort processor 42 starts operation in Step S3, and receives the data "8" outputted from the first-stage sort processor 41. Then, in the same way as in Step S3, the second-stage sort processor 42 receives "2" in Step S4 and "3" in Step S5. Then, in Step S6, the second-stage sort processor 42 compares "8" and "3" and outputs "8" which is a greater numerical value, and designates "2" as the data to be compared next. Meanwhile, the second-stage sort processor 42 receives a new numerical value "1" from the first-stage sort processor 41, and this value "1" is stored by being stacked after "3." In Step S7, the second-stage sort processor 42 compares "2" and "3," 1 and outputs "3" which is a greater numerical value.

As described above, the output of the sorted result is started before the sort processor receives the overall data string to be sorted (in this case, before Step S6).

In this way, the rearrangement, i.e., sorting, of $2^n$ pieces of data is carried out by n sort processors.

Here, since the storage capacities of the shared storage devices 45 to 48 connected to the respective sort processors 41 to 44 are determined by the capacities of memory chips, the configuration, and the like, these storage capacities in reality are not necessarily two-fold that of the preceding stage. For instance, memory chips each having a capacity of 512 KB are mounted in all of the first 10 stages, a memory chip having a capacity of 1 MB is mounted in the 11th stage, a memory chip having a capacity of 2 MB is mounted in the 12th stage, and likewise in the subsequent stages.

Since the conventional data processing apparatus 1 is configured as described above, the following problems are encountered.

Different processing cannot be executed while certain processing is being executed. For instance, if the data processing apparatus 1 starts the execution of processing which requires a long time in execution, other processing cannot be executed.

In particular, in cases where a small number of processing operations whose loads are heavy and a large number of processing operations whose loads are light are present, if the execution of processing whose load is heavy is started, the wait time for the processing whose load is light becomes very long, resulting in a decline in the throughput of the system.

If an attempt is made to execute the plurality of processing operations simultaneously to overcome the above-described problem, there arises a need to connect a plurality of data processing apparatuses to the host computer, which results in increased cost.

In general, in corporate database operations, a multiplicity of processing operations whose loads are relatively light, such as marketing support, are executed in the daytime, while a small number of processing operations whose loads are heavy, such as daily batch processing, are executed in the nighttime. For this reason, a large number of data processing apparatuses are desirable for operations in the daytime, while a small number of high-speed data processing apparatuses are desirable for operations in the nighttime. However, insofar as the conventional data processing apparatuses are used, it is necessary to install a large number of data processing apparatuses in order to meet the demands for the daytime, while most of these data processing apparatuses are not used in the nighttime. Hence, the rate of utilization of resources declines.

SUMMARY OF THE INVENTION

The present invention has been made to overcome the above-described problems, and an object of the invention is to provide an apparatus which, in database processing such as sorting, permits the parallel operation of other processing on a time-sharing basis and, particularly, makes it possible to improve the response time of processing whose load is light, even when processing which requires a long time in execution is being executed. Another object of the present invention is to provide an apparatus whose number of degrees of multiprocessing is made variable so as to allow the apparatus to be used both as a high-speed single processing apparatus in the daytime and as a multiprocessing apparatus with a high throughput in the nighttime.

In accordance with the present invention, there is provided a sorting method comprising the steps of: separating as a data-block separating step a first data block consisting of a plurality of records into a plurality of first small data blocks each including a plurality of records; sorting as a first sorting step the plurality of records included in each of the plurality of first small data blocks by a sort processing unit; sorting as a second sorting step a plurality of records included in a second data block different from the first data block by the sort processing unit; sorting by the sort processing unit as a third sorting step the first small data block not sorted in the first sorting step; and generating as a data-block merging step a sorted data block by merging the plurality of first small data blocks sorted in the first sorting step and the third sorting step.

In accordance with the present invention, there is provided a sort processing device comprising: a first multiple-input control unit which accepts a plurality of sort processing operations, and outputs sort data concerning one of the sort processing operations under a predetermined processing condition, and after completion of the outputting thereof sort data concerning another one of the sort processing operations; a sort processing unit for sorting the sort data sent thereto from the first multiple-input control unit; and a multiple-output control unit for collectively outputting data for each sort processing operation by discriminating which sort processing operation the sort data sent from the sort processing unit concerns.

The first multiple-input control unit outputs the sort data concerning a part of one sort processing operation among the plurality of sort processing operations for a predetermined time duration, and after completion of the outputting thereof outputs the sort data concerning a part of another sort processing operation for a predetermined time duration.

The first multiple-input control unit outputs a predetermined data amount of the sort data concerning a part of one sort processing operation among the plurality of sort processing operations, and after completion of the outputting thereof outputs a predetermined data amount of the sort data concerning a part of another sort processing operation.

The first multiple-input control unit accepts the plurality of sort processing operations, outputs the sort data concerning one sort processing operation until one of a condition that the sort data is outputted for a predetermined time duration and a condition that a predetermined data amount of the sort data is outputted is satisfied, and after completion of the outputting thereof outputs the sort data concerning another sort processing operation until one of a condition that the sort data is outputted for a predetermined time duration and a condition that a predetermined data amount of the sort data is outputted is satisfied.

When a shift is made from one sort processing operation to another sort processing operation, the sort processing unit stores all the records of the sort data concerning the part of one sort processing operation outputted by the first multiple-input control unit.

The first multiple-input control unit is capable of variably setting a maximum number of the sort processing operations which the first multiple-input control unit accepts.

When outputting the sort data concerning the sort processing operation, the first multiple-input control unit outputs the sort data with end data added thereto if an error or cancellation concerning the sort processing operation is detected, and the first multiple-input control unit suspends the sort processing operation, while the multiple-output control unit reads up to the end data the sort data concerning the sort processing operation from the sort processing unit.

In accordance with the present invention, there is provided a data processing apparatus comprising: a second multiple-input control unit which accepts a sort processing operation and a database processing operation, outputs sort data concerning the sort processing operation under a predetermined processing condition, and after the outputting thereof outputs data concerning the database processing operation under a predetermined processing condition; a sort processing unit constituted by a plurality of sort processors connected in series, and adapted to sort the sort data sent thereto from the second multiple-input control unit; a database processing unit for performing the database processing operation with respect to the data sent thereto from the second multiple-input control unit; and a multiple-output control unit which collectively outputs the sort data sent thereto from the sort processing unit or the data sent thereto from the database processing unit for each of the sort processing operation and the database processing operation by discriminating whether the data sent to the multiple-output control unit is the data concerning the sort processing operation or the database processing operation.

The data processing apparatus further comprises: a shared storage section connected to the sort processing unit and the database processing unit, to allow the database processing unit to use storage memory which is not used for sort processing as at least one of the plurality of sort processors is bypassed.

The second multiple-input control unit outputs the sort data concerning the part of the sort processing operation for a predetermined time duration, and after the outputting thereof outputs the data concerning the part of the database processing operation for a predetermined time duration.

The second multiple-input control unit accepts a sort processing operation and a database processing operation, outputs a predetermined data amount of the sort data concerning the sort processing operation, and after the outputting thereof outputs a predetermined data amount of the data concerning the database processing operation.

The second multiple-input control unit accepts a sort processing operation and a database processing operation, outputs the sort data concerning the sort processing operation until one of a condition that the sort data is outputted for a predetermined time duration and a condition that a predetermined data amount of the sort data is outputted is satisfied, and after the outputting thereof outputs the data concerning the database processing operation for a predetermined time duration.

At least one of the sort processors is used for an ascending/descending order check.

The second multiple-input control unit is capable of variably setting a maximum number of the sort processing operations and the database processing operations other than the sort processing operations which the second multiple-input control unit accepts. Consequently, the second multiple-input control unit accepts processing within the scope which does not exceed the upper limit, and outputs the accepted data for processing to the sort processing unit or the database processing unit.

As described above, the sorting method in accordance with the present invention comprises the steps of: separating as a data-block separating step a first data block consisting of a plurality of records into a plurality of first small data blocks each including a plurality of records; sorting as a first sorting step the plurality of records included in each of the plurality of first small data blocks by a sort processing unit; sorting as a second sorting step a plurality of records included in a second data block different from the first data block by the sort processing unit; sorting by the sort processing unit as a third sorting step the first small data block not sorted in the first sorting step; and generating as a data-block merging step a sorted data block by merging the plurality of first small data blocks sorted in the first sorting step and the third sorting step. Therefore, in operation, as compared with a case where the entire first data block is sorted, the first sorting step is finished in a short time, and the second sorting step is then executed. After completion of the second sorting step, the third sorting step for sorting the first data block again is executed in a short time.

As described above, the sort processing device in accordance with the present invention comprises: a first multiple-input control unit which accepts a plurality of sort processing operations, and outputs sort data concerning one of the sort processing operations under a predetermined processing condition, and after completion of the outputting thereof sort data concerning another one of the sort processing operations; a sort processing unit for sorting the sort data sent thereto from the first multiple-input control unit; and a multiple-output control unit for collectively outputting data for each sort processing operation by discriminating which sort processing operation the sort data sent from the sort processing unit concerns. Accordingly, in operation, the first multiple-input control unit outputs data by changing over the plurality of sort processing operations under a predetermined condition, the sort processing unit receives and sorts the data, and the multiple-output control unit outputs the sorted data sent from the sort processing unit separately for each sort processing operation.

In addition, the first multiple-input control unit outputs the sort data concerning a part of one sort processing operation among the plurality of sort processing operations for a predetermined time duration, and after completion of the outputting thereof outputs the sort data concerning a part of another sort processing operation for a predetermined time duration. Accordingly, the first multiple-input control unit outputs data by changing over the plurality of sort processing operations in the predetermined time, the sort processing unit receives and sorts the data, and the multiple-output control unit outputs the sorted data sent from the sort processing unit separately for each sort processing operation.

In addition, the first multiple-input control unit outputs a predetermined data amount of the sort data concerning a part of one sort processing operation among the plurality of sort processing operations, and after completion of the outputting thereof outputs a predetermined data amount of the sort data concerning a part of another sort processing operation. Accordingly, data concerning one sort processing operation is divided into fixed sizes to generate small data blocks, and the data is outputted while the plurality of sort processing operations are changed over for each small data block.

In addition, the first multiple-input control unit accepts the plurality of sort processing operations, outputs the sort data concerning one sort processing operation until one of a condition that the sort data is outputted for a predetermined time duration and a condition that a predetermined data amount of the sort data is outputted is satisfied, and after completion of the outputting thereof outputs the sort data concerning another sort processing operation until one of a condition that the sort data is outputted for a predetermined time duration and a condition that a predetermined data amount of the sort data is outputted is satisfied. Accordingly, data of not more than a fixed amount is outputted to the sort processing unit, and the sort processing operation is changed over for each fixed time.

In addition, when a shift is made from one sort processing operation to another sort processing operation, the sort processing unit stores all the records of the sort data concerning the part of one sort processing operation outputted by the first multiple-input control unit. Therefore, the sort processing operation is not changed over before all the data of one small data block is inputted to the sort processing unit.

In addition, the first multiple-input control unit is capable of variably setting a maximum number of the sort processing operations which the first multiple-input control unit accepts. Therefore, the first multiple-input control unit accepts processing within the scope which does not exceed the upper limit, and outputs the accepted data for processing to the sort processing unit.

In addition, when outputting the sort data concerning the sort processing operation, the first multiple-input control unit outputs the sort data with end data added thereto if an error or cancellation concerning the sort processing operation is detected, and the first multiple-input control unit suspends the sort processing operation, while the multiple-output control unit reads up to the end data the sort data concerning the sort processing operation from the sort processing unit. Accordingly, upon detecting an error or cancellation, the first multiple-input control unit outputs the sort data with the end data added thereto without outputting the remaining of the sort data being outputted, and suspends the sort processing operation. To remove the sort data concerning the suspended sort processing operation from the sort processing unit, the multiple-output control unit processes another normal sort processing operation without resetting the data concerning the suspended sort processing operation together with the sort data concerning another normal sort processing operation remaining in the sort processing unit. Meanwhile, the multiple-output control unit reads the sort data concerning the suspended sort processing operation remaining in the sort processing unit, to ensure that the data does not remain in the sort processing unit.

As described above, the data processing apparatus in accordance with the present invention comprises: a second multiple-input control unit which accepts a sort processing operation and a database processing operation, outputs sort data concerning the sort processing operation under a predetermined processing condition, and after the outputting thereof outputs data concerning the database processing operation under a predetermined processing condition; a sort processing unit constituted by a plurality of sort processors connected in series, and adapted to sort the sort data sent thereto from the second multiple-input control unit; a database processing unit for performing the database processing operation with respect to the data sent thereto from the second multiple-input control unit; and a multiple-output control unit which collectively outputs the sort data sent thereto from the sort processing unit or the data sent thereto from the database processing unit for each of the sort processing operation and the database processing operation by discriminating whether the data sent to the multiple-output control unit is the data concerning the sort processing operation or the database processing operation. Accordingly, the second multiple-input control unit outputs the sort data concerning the sort processing operation and the data concerning the database processing operation by changing them over under a predetermined condition, and the multiple-output control unit outputs the sort data and the data separately for each processing type by discriminating between the sort data and the data.

In addition, as described above, the data processing apparatus further comprises: a shared storage section connected to the sort processing unit and the database processing unit, to allow the database processing unit to use storage memory which is not used for sort processing as at least one of the plurality of sort processors is bypassed. Accordingly, part of the storage memory of the sort processors is used for the database processing unit, and the remaining storage memory is used for sort processing, such that data concerning both database processing and sort processing are stored simultaneously, thereby using the storage memory in such a manner as not to cause mutual interference to the data.

In addition, the second multiple-input control unit outputs the sort data concerning the part of the sort processing operation for a predetermined time duration, and after the outputting thereof outputs the data concerning the part of the database processing operation for a predetermined time duration. Accordingly, the second multiple-input control unit outputs the sort data concerning the sort processing operation and the data concerning the database processing operation by changing them over in the predetermined time, and the multiple-output control unit outputs the sort data and the data separately for each processing type by discriminating between the sort data and the data.

In addition, the second multiple-input control unit accepts a sort processing operation and a database processing operation, outputs a predetermined data amount of the sort data concerning the sort processing operation, and after the outputting thereof outputs a predetermined data amount of the data concerning the database processing operation. Therefore, after outputting a predetermined data mount of the sort data, the second multiple-input control unit outputs data concerning the database processing operation.

In addition, the second multiple-input control unit accepts a sort processing operation and a database processing operation, outputs the sort data concerning the sort processing operation until one of a condition that the sort data is outputted for a predetermined time duration and a condition that a predetermined data amount of the sort data is outputted is satisfied, and after the outputting thereof outputs the data concerning the database processing operation for a predetermined time duration. Accordingly, sort processing and database processing can be executed in parallel by one data processing apparatus, and data which are inputted in the fixed time are changed over.

In addition, since at least one of the sort processors is used for an ascending/descending order check, the ascending/descending order check is performed by using at least one sort processor. When sort processing is carried out, the sort processor which effects the ascending/descending order check is bypassed, and the other sort processors execute the sort processing operation. Thus, the sort processor which effects the ascending/descending order check does not interfere with the contents stored in the other sort processors, while the other processors do not interfere with the contents stored in the processor which effects the ascending/descending order check.

In addition, the second multiple-input control unit is capable of variably setting a maximum number of the sort processing operations and the database processing operations other than the sort processing operations which the second multiple-input control unit accepts. Consequently, the second multiple-input control unit accepts processing within the scope which does not exceed the upper limit, and outputs the accepted data for processing to the sort processing unit or the database processing unit.

BRIEF DESCRIPTION OF THE DRAWINGS

The accompanying drawings, which are incorporated in and constitute a part of this specification, illustrate (an) embodiment(s) of the invention and, together with the description, serve to explain the objects, advantages and principles of the invention. In the drawings.

FIG. 3 is a diagram explaining input/output commands of the data processing apparatus in accordance with the first embodiment of the present invention;

FIG. 5 is a diagram explaining the flow of data in the sort processing device in accordance with the first embodiment of the present invention;

DETAILED DESCRIPTION OF THE PREFERRED EMBODIMENTS

First Embodiment

Hereafter, a description will be given of an embodiment of the present invention. In the following embodiment, it is assumed for the sake of simplicity of the description that the number of degrees of multiprocessing conducted in parallel on a time-sharing basis is two. In general, however, three or greater degrees of multiprocessing can be easily realized on the basis of this embodiment. In addition, database processing which is executed in multiplicity in parallel by the data processing apparatus will be hereafter referred to explicitly as a "job." In the case of one degree of multiprocessing, only a job 0 is multiprocessed by the data processing apparatus, and in the case of two degrees of multiprocessing the job 0 and a job 1 are multiprocessed by the data processing apparatus on a time-sharing basis. In a case where the job 0 and the job 1 are multiprocessed by being changed over by the data processing apparatus on a time-sharing basis, a part of each job for execution, which constitutes a unit of changeover, will be referred to as a "job step". Furthermore, since there are cases where different jobs are executed inside the data processing apparatus on the data input side thereof (i.e., for writing with respect to the data processing apparatus) and on the data output side thereof (i.e., for reading from the data processing apparatus) in the light of the characteristic of the sort processing device, as will be described later, the jobs and the job steps will be referred to as a write-side job and a write-side job step, and a read-side job and a read-side job step, respectively.

Figure 1:
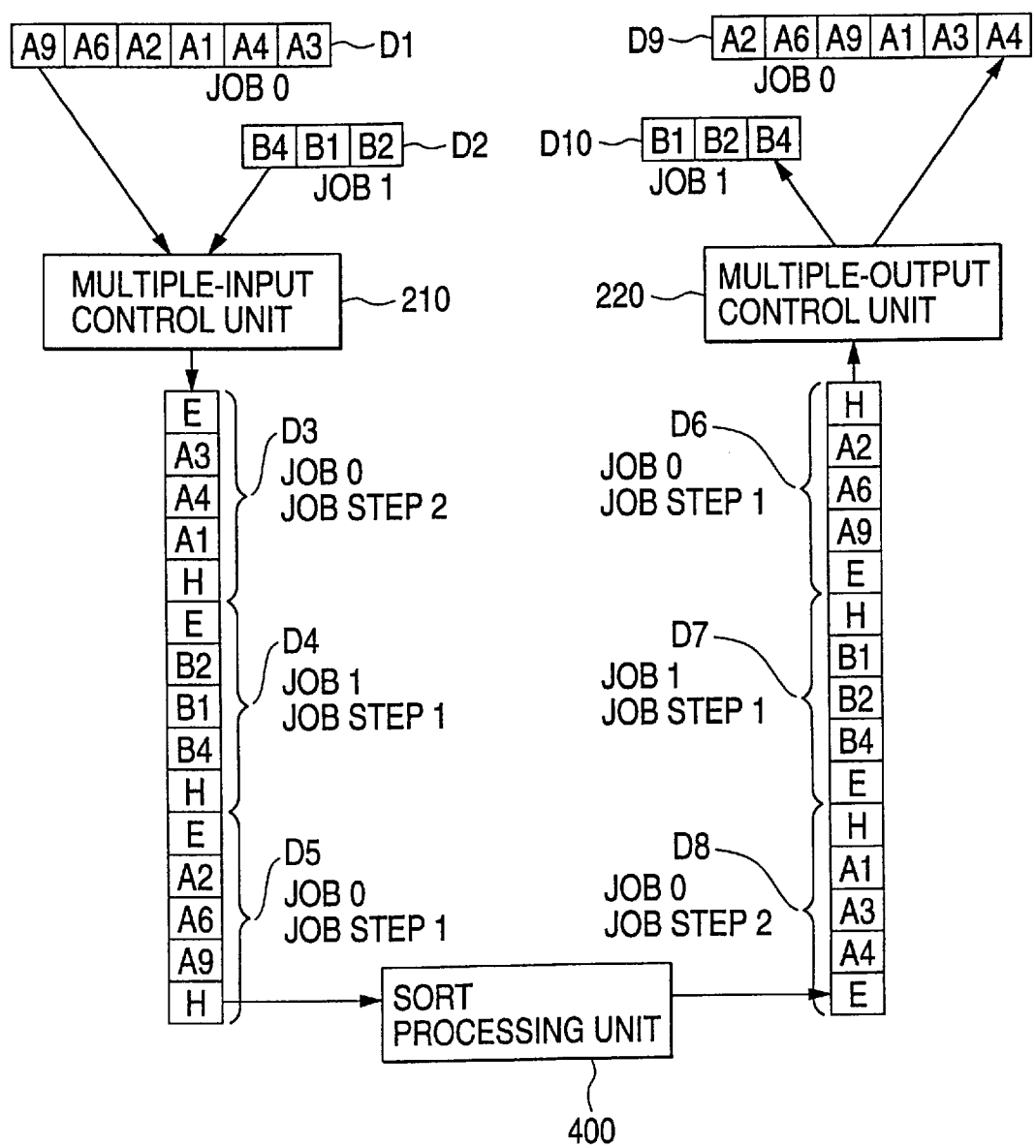
FIG. 1 is a functional block diagram of a data processing apparatus in accordance with a first embodiment of the present invention.

FIG. 1 is a diagram explaining an outline of sort processing in accordance with the embodiment of the present invention. In FIG. 1, reference numeral 210 denotes a multiple-input control unit which receives a plurality of job data from the outside, divides the job data into small data blocks on a time-sharing basis (i.e., divided into job steps), and outputs the same to a sort processing unit 400. Reference numeral 220 denotes a multiple-output control unit which outputs collectively for each job the small data blocks (i.e., job step data) subject to plural processing, which have been sorted by and received from the sort processing unit 400. Numeral 400 denotes the sort processing unit which sorts the small data blocks received (job step data) for each block.

Reference characters D1 and D2 denote job data to be sorted which are sent from, for example, the CPU or the like, and D1 denotes the data of the job 0, while D2 denotes the data of the job 1. The data D1 and the data D2 are data subject to different sort processing.

Reference characters D3 and D5 denote data of job steps generated by dividing the job 0, and D3 denotes the data of the job step 2, while D5 denotes the data of the job step 1. Reference character D5 denotes the data of the job step 1 of the job 1.

Reference character D6 denotes data obtained by sorting the data D3 by the sort processing unit 400; D7 denotes data obtained by sorting the data D4; and D8 denotes data obtained by sorting the data D5. The data D3 to D8 are respectively provided with a header H indicating the beginning of the job step and for initializing the sort processing unit 400, as well as end data E indicating an end of the job step. Reference character D9 denotes sorted data obtained by combining the data D6 and the data D8 concerning the job 0 by the multiple-output control unit 220. Reference character D10 denotes the sorted data obtained by combining the data of the job 1 (in this case, the data concerning the job 1 is only D7).

Next, the operation will be described briefly. It is assumed that the multiple-input control unit 210, which is capable of accepting plural sort processing, first accepted the data D1 concerning the job 0, and then accepted the data D2 concerning the job 1. Here, the values A1–A9 of the data D1 and the values B1–B4 of the data D2 mean that the greater the numerals, the greater value they are, and it is assumed that sort processing is one in which the values are rearranged in descending order.

Operation of Multiple-Input Control Unit 210

Next, the multiple-input control unit 210 selects one job from the jobs it has accepted, and outputs the same to the sort processing unit 400. Here, the multiple-input control unit 210 outputs the data D1 of the job 1 it accepted earlier. In outputting, after one job is divided into a plurality of job steps, the job steps are outputted. For example, it is assumed that the data D1 concerning the job 0 is read during a predetermined time t [s] and is then outputted. Here, at a point of time when three pieces of data A1–A3 have been read, the time t [s] elapses, whereupon the header H and the end data E are attached to the data, which are then outputted to the sort processing unit 400 (data D5).

During an ensuing time t [s], the data concerning the job 1 is read, and is similarly outputted to the sort processing unit 400 (data D4). Meanwhile, while this reading is being carried out, the sort processing unit 400 carries out the sort processing of the earlier data D5 of the job step 1.

During an ensuing time t [s], the multiple-input control unit 210 starts the reading of the job step of an ensuing job. Here, since only two jobs are accepted, the operation returns to the job 0 again, and the data D1 of the job 0 is read as the data D3 of the job step 2. Then, by attaching the header H and the end data E in the same way as described above, the data D3 of the job step 2 is completed, and is outputted to the sort processing unit 400. Meanwhile, while this reading is being carried out, the sort processing unit 400 carries out the sort processing of the earlier data D4 of the job step 1.

Operation of Sort Processing Unit 400

The sort processing unit 400 receives the data D3–D5 from the multiple-input control unit 210, sorts them for each job step, and outputs the same. For example, the sort processing unit 400 receives the data D4 of the job 1 in the order of B4, B1, and B2, sorts them, and outputs them in the order of B1, B2, and B4.

Operation of Multiple-Output Control Unit 220

The multiple-output control unit 220 receives the data sorted for each job step from the sort processing unit 400, and outputs them collectively for each job. Accordingly, the multiple-output control unit 220 first receives the data D6 of the job step 1 of the job 0, then receives the data D7 of the job 1, and receives the data D8 of the job step 2. The multiple-output control unit 220 adds the data D7 of the job step 2 to the end of the data D6 of the job step 1 of the job 0, and outputs the same as the data D9. Meanwhile, the data of the job 1 is outputted as different data D10.

Although, in the foregoing description, the job is divided by using the time t [s] as a reference as the method of generating job steps by dividing the job, the job may be divided by using the amount of inputted or outputted data as a reference. For example, in a case where the amount of data which can be sorted at a time by the sort processing unit 400 is fixed, the job may be divided into job steps at a point of time when the outputting of this amount of data is completed. In the case of FIG. 1, it can be said that the job is divided into job steps each time three pieces of data are outputted.

If the data of the job is divided by using job steps, since the sorted result becomes one in which the data is partially sorted as in the case of the data D9 (in D9, the data is divided into two blocks with a boundary between A9 and A1), it is necessary to merge them into a single piece of sorted data. Accordingly, it is advantageous if the number of divisions of the data is fewer since the merge processing is facilitated. If the amount of data is used as a reference for dividing the job into job steps, the size of the job steps can be adjusted to a maximum amount which can be sorted at a time by the sort processing unit 400, and the number of divisions of the data can be minimized as described above, thereby making it possible to reduce the amount of processing involved in the merge processing.

The advantage of dividing the job into job steps by using the time as a reference is found particularly in the following case. When a data processing apparatus 1 having a database processing device 3, which will be described later, is used to execute a job in which data is retrieved, and the retrieved data is then sorted, there are cases where it takes a long time to collect the data to be outputted to the sort processing unit 400 by the multiple-input control unit 210. For instance, it is assumed that the number of data obtained by retrieving 10,000 pieces data was 10, and that it took a considerable time to retrieve the 10,000 pieces of data. In the method of dividing the job into job steps by using the amount of data as a reference, in a case where, as a rule, the job is divided into job steps at a time when, for example, 100 pieces of data have been collected, the operation cannot proceed to an ensuing job step unless 100 pieces of data of the job are collected, or all the retrieval is completed. As such, other jobs which do not take much time must continue to wait until this job step is completed, so that the throughput declines. In such a case, the method of dividing the job into job steps at a time when a fixed time has elapsed is advantageous, and it is possible to prevent one job from continuing to use the sort processing unit 400 (database processing device 3) for a long time by precluding the use thereof by other jobs. Consequently, the overall throughput improves.

The data processing apparatus 1 combines the method of dividing the job into job steps by using the amount of data as a reference and the method of dividing the job into job steps by using the time as a reference, so as to be provided with the advantages of the two methods.

In addition, since the sorted data D9 has been sorted by dividing the data into a plurality of job steps, the data D9 has been sorted in a state in which it is divided into a plurality of blocks, as described above. Such being the case, since the data of the job 0 as a whole has not been sorted, it is necessary to set the overall data D9 in a sorted state (this will be referred to as merge processing). This processing is effected by the database processing device 3 which will be described later. To describe an example of this processing, first, a comparison is made between the data A2 and the data A1 which were respectively at the beginnings of the job steps 1 and 2 of the data D9, and the smaller data A1 is set as an initial value. Next, a comparison is made between A3 and A2 which are the data following A1, and the smaller data A2 is set as the ensuing data. Similarly, the operation is repeated in the following manner so as to effect merge processing.

To describe this processing from the beginning

A2:A1 A1

A2:A3 A2

A6:A3 A3

A6:A4 A4

A6:A9 A6 A9

This merges the data of the job 0, and sorting is thus carried out. The final comparison between A6 and A9 is made because of the fact that since the data on the right-hand side of A1 of the data D9 in FIG. 1 (A1, A3, and A4) have disappeared, it is necessary to compare the pieces of data which are on the left-hand side of A1 and still remain without being adopted as the sorted data.

Figure 18:
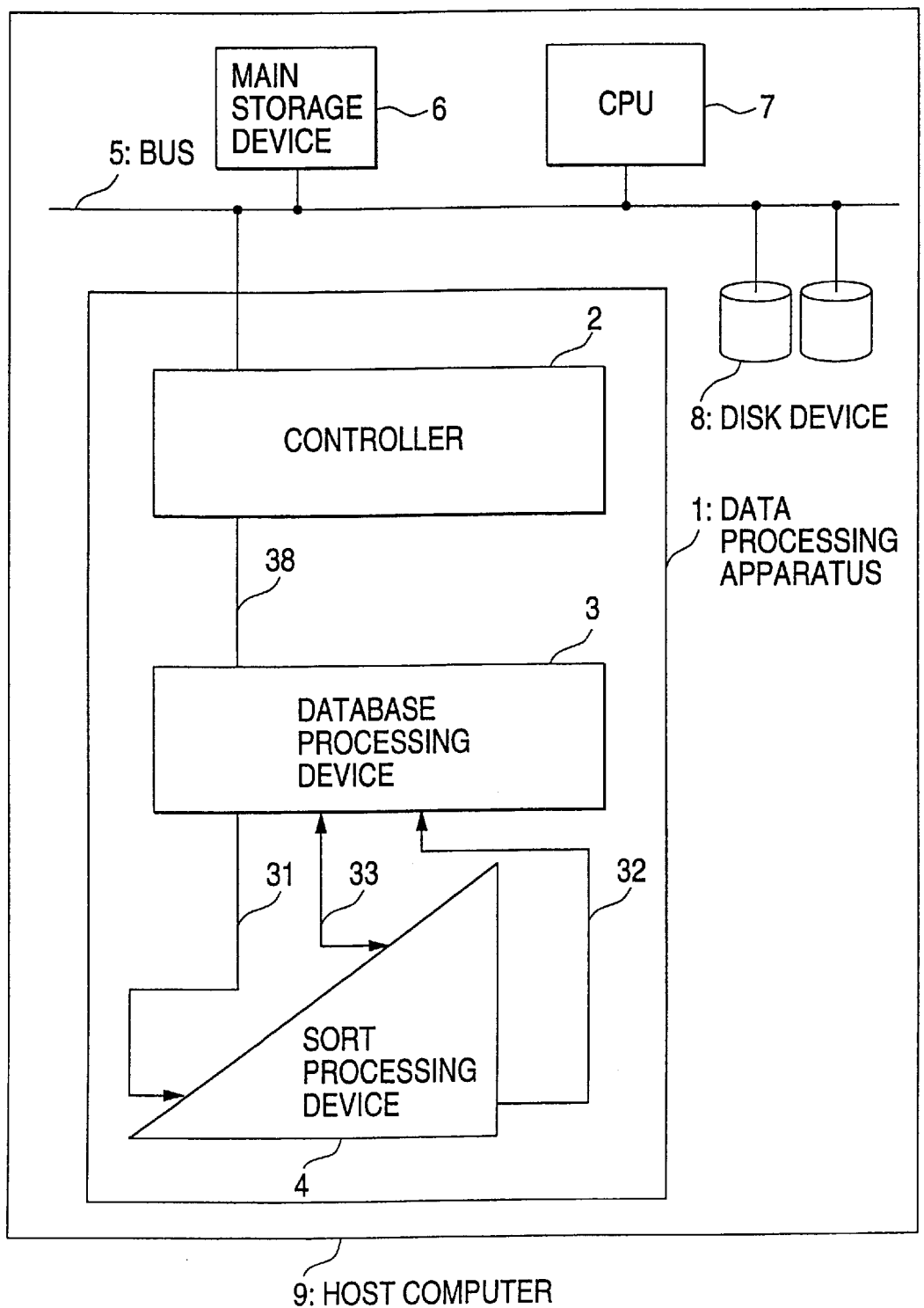
FIG. 18 is a schematic diagram illustrating an overall configuration of a conventional database system.

To give a description for assurance' sake, the above-described merge processing is not generated to divide the job into job steps in the present invention. Similar merge processing is required in the conventional sort processing as well. The reason for this is that this division of data is necessitated because there is a limit to the amount of data which can be sorted at a time by the sort processing unit 400 (the sort processing device 4 in the conventional data processing apparatus shown in FIG. 18), and in a case where data exceeding the data capacity of the sort processing unit 400 is handled, it is necessary to effect sorting after one item of data is divided into a plurality of pieces of data.

With the conventional sort processing, after the execution of an initially allocated job is completed, the execution of an ensuing job is started. For this reason, unless the sorting corresponding to the aforementioned job 0 and the above-described merge processing have been completed, the processing corresponding to the aforementioned job 1 cannot be effected. Hence, the result of the job 1 cannot be obtained only after a long time has elapsed.

In contrast, in the sort processing in accordance with the present invention, as shown in FIG. 1, the multiple-output control unit 220 outputs the job step 1 concerning the job 1 after the job step 1 of the job 0 is outputted. Since the job step 1 of the job 1 includes all the result of processing of the job 1, the processing of the job 1 is completed at this point of time. Namely, even if the job 0 requiring a long time in processing is not completed the result of the job 1 can be obtained, so that a high throughput can be realized in sort processing.

Details of the Data Processing Apparatus 1

Hereafter, a description will be given of the details of the data processing apparatus 1 in accordance with the present invention. This data processing apparatus 1 effects the operation corresponding to the above-described sort processing, but is provided with the database processing device 3 for effecting the processing other than sort processing (the merge processing, retrieval processing, etc., of data) so as to be capable of executing sort processing and database processing other than sorting in parallel.

Figure 2:
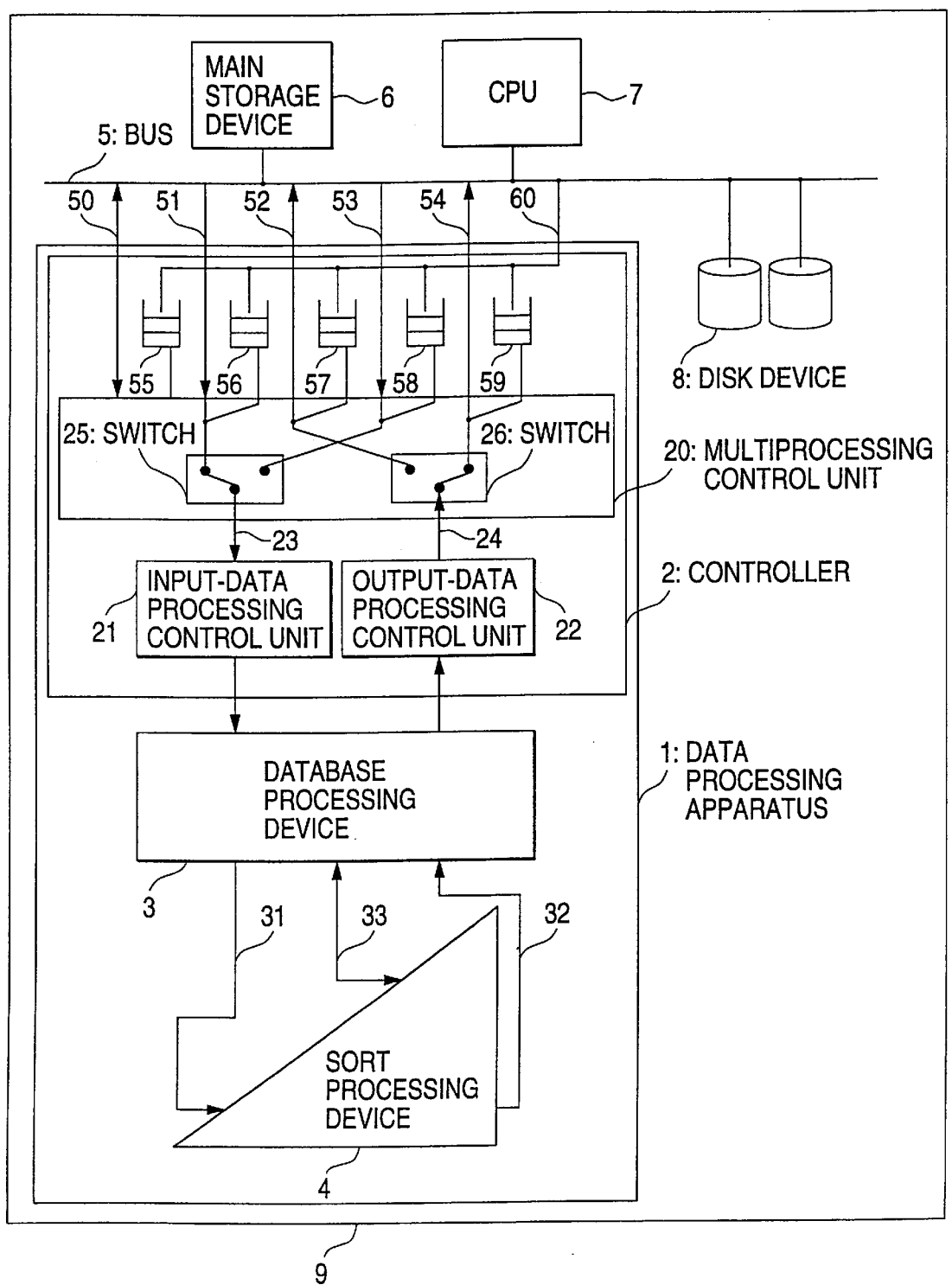
FIG. 2 is a schematic diagram illustrating an overall configuration of a database system in accordance with the first embodiment of the present invention.

FIG. 2 is a diagram illustrating an overall configuration of the database processing system in accordance with the present invention. In FIG. 2, the same reference numerals as those in FIG. 18 denote identical or corresponding portions, wherein reference numeral 50 denotes a connecting line for initializing the data processing apparatus 1 and effecting a change of the number of degrees of multiprocessing, and the like; numerals 51 and 52 denote connecting lines for inputting data and outputting data with respect to the job 0, respectively; and numerals 53 and 54 denote connecting lines for inputting data and outputting data with respect to the job 1, respectively. Addresses are respectively allocated to the connecting lines 50 to 54, and access to a controller 2 using the connecting lines 50 to 54 is effected by designating these addresses. Numerals 55 to 59 denote queues for temporarily retaining input/output commands which are sent from a CPU 7 to these connecting lines 50 to 54. Input/output commands corresponding to the respective addresses are sent from the CPU 7 by means of a connecting line 60, and the input/output commands are stored in the corresponding queues. In addition, the states of success and error and the like of processing with respect to these input/output commands are also notified to the host computer via this connecting line 60.

In the controller 2 of the data processing apparatus 1, reference numeral 20 denotes a multiprocessing control unit for multiprocessing a plurality of processing operations commanded by the CPU 7; 21 denotes an input-data processing control unit for controlling the processing concerning data input; 22 denotes an output-data processing control unit for controlling the processing concerning data output; 23 denotes a connecting line through which input/output commands and data concerning the processing on the data input side selected by the multiprocessing control unit 20 are sent; and 24 denotes a connecting line through which input/output commands and data concerning the processing on the data output side selected by the multiprocessing control unit 20 are sent. Numeral 25 denotes a switch for selectively connecting a particular connecting line of the multiple connecting lines and the like concerning an input (the connecting line 51 and a queue 56; the connecting line 53 and a queue 58) to the database processing device 3, while numeral 26 denotes a switch for connecting to a connecting line for data to be returned from the database processing device 3 to the CPU 7 and corresponding to an address designating a state of processing end.

In this first embodiment, an input/output device address for a host computer 9 is allocated to the data processing apparatus 1 itself, and it is assumed that 0, 1, 2, 3, and 4 are imparted to the connecting lines 50, 51, 52, 53, and 54 inside the data processing apparatus 1 as unit addresses. For example, if the input/output device address of the data processing apparatus 1 is 12, the connections of the data processing apparatus 1 to a bus 5 are respectively (12, 0), (12, 1), (12, 2), (12, 3), and (12, 4). Hereafter, it is assumed that only one data processing apparatus 1 is connected to the host computer 9, and that the input/output device address in these addresses is omitted in expressing the addresses, and they are simply expressed as (0), (1), (2), (3), and (4). In addition, it is assumed that the input and output of data between the host computer 9 and the data processing apparatus 1 at the address (1), for instance, refers to the input and output of data using the connecting line 51.

The address (0) is used to control the data processing apparatus 1; the addresses (1) and (3) are used for inputting data from the CPU 7 with respect to the data processing apparatus 1, i.e., transmitting data in the write direction; and the addresses (2) and (4) are used for outputting data from the data processing apparatus 1 to the host computer 9, i.e., transmitting data in the read direction.

In this first embodiment, the CPU 7 issues an input/output command to the data processing apparatus 1, as shown in FIG. 3. Namely, by designating the address (0) to the data processing apparatus 1, the CPU 7 issues a restart command to instruct an operation start. At this juncture, the number of degrees of multiprocessing is set to 1 or 2. For instance, in a case where the data processing apparatus 1 is started by setting the number of degrees of multiprocessing to 1, only the set of the addresses (1) and (2) are subsequently made operable, whereas in a case where the data processing apparatus 1 is started by setting the number of degrees of multiprocessing to 2, both the set of the addresses (1) and (2) and the set of the addresses (3) and (4) are subsequently made operable. Hereafter, it is assumed that the job 0 and the job 1 are respectively executed in correspondence with the set of the addresses (1) and (2) and the set of the addresses (3) and (4).

Next, a description will be given of a basic method of using this data processing apparatus from the host computer 9. When a request for processing by the data processing apparatus 1 has been made by the host computer 9, the CPU 7 selects an operable and presently unused set from the set of the addresses (1) and (2) and the set of the addresses (3) and (4). If the set of the address (1) and (2) is selected, the CPU 7 issues an "open" command to each of the addresses (1) and (2), and notifies the initialization of processing to the data processing apparatus 1. Next, the CPU 7 issues an "xfer" command a plurality of times, and effects the transfer of data to the data processing apparatus 1. At this time, with respect to the address (1) the data is inputted from the CPU 7 to the data processing apparatus 1, and with respect to the address (2) the data is outputted from the data processing apparatus 1 to the CPU 7. Upon completion of processing, the CPU issues a "close" command to each address, instructing an end of processing.

As described above, and shown in FIG., 4 in order to effect certain specific data processing, it is necessary to execute a string of input/output commands of open, xfer, xfer, . . . xfer, close with respect to both the input to and the output from the data processing apparatus 1.

Figure 4:
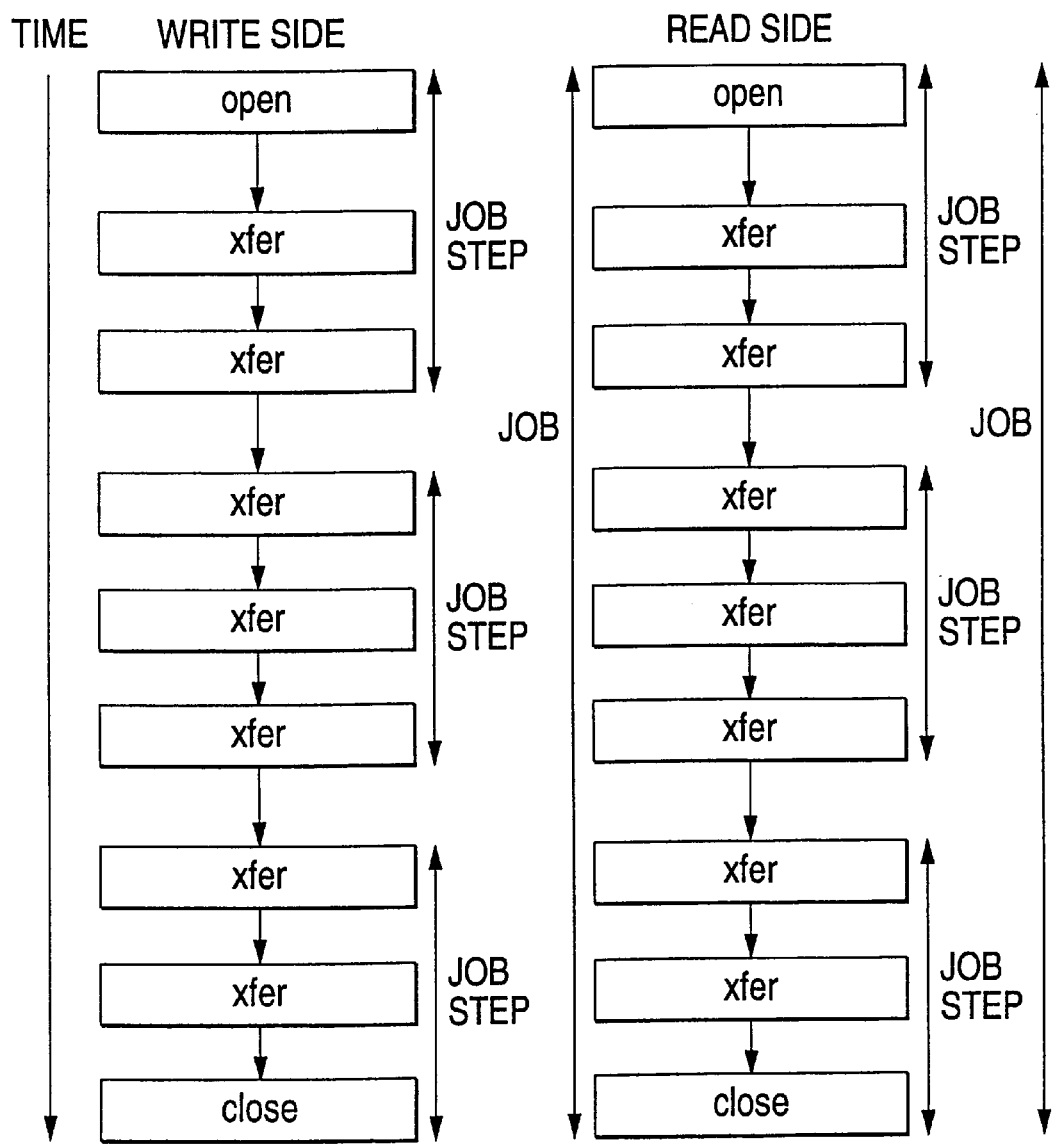
FIG. 4 is a diagram explaining jobs and job steps in accordance with the first embodiment of the present invention.

In the above, the entire series of processing with respect to the set of addresses, ranging from open to close via a plurality of xfer's, constitutes one processing, i.e., one job, as viewed in the light of the host computer. In addition, portions which are obtained by dividing this series of processing, open, xfer, xfer, . . . xfer, close, into a number of sections correspond to job steps. This relationship is shown in FIG. 4. The division of the job into job steps is carried out by using as a reference a processing time or a predetermined amount of data allowed to the job step. A description will be given later of this division. As another method of realizing this division, the job may be changed over when the number of input/output commands issued has reached a fixed numerical value.

Next, a description will be given of a means for effecting multiprocessing in the sort processing device 4.

First, when data belonging to the job 0 is written in the sort processing device 4, and data belonging to another job 1 is then written in the sort processing device 4, in the light of the characteristic of the sort processing device 4, it is necessary to simultaneously effect the writing of the job 1 and the reading of data of the job 0 remaining in the sort processing device 4. Accordingly, in the multiprocessing with respect to the sort processing device 4, it is necessary to simultaneously execute different jobs to process the data input on the write side) and process the data output (on the read side).

This process is shown in FIG. 5. In FIG. 5, numerals 61 and 62 denote data of divided job steps, respectively, and numeral 61 denotes write data to be written in the sort processing device 4, while numeral 62 denotes read data to be read from the sort processing device 4. Numeral 63 denotes data in the sort processing device 4. Further, blank portions in the data 61, 62, and 63 indicate that there are no data, while hatched portions 64 and 65 indicate that there are data. The hatched portion denoted by the reference numeral 64 is the data of the job 0, while the hatched portion denoted by the reference numeral 65 is the data of the job 1.

Next, a description will be given of the operation of inputting data to and outputting data from the sort processing device 4. In FIG. 5, the operation is first started in a state in which there is no data inside the sort processing device 4, as shown in Step S20.

Figure 20:
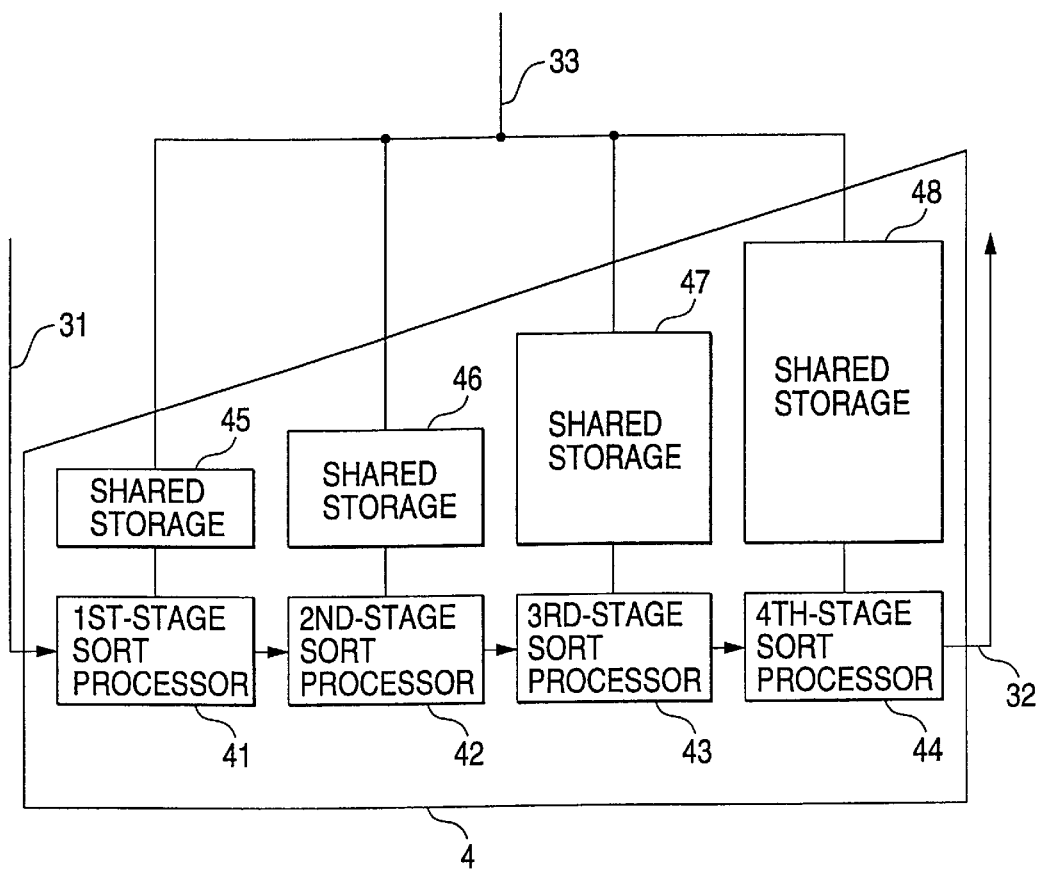
FIG. 20 is a functional block diagram illustrating in detail the conventional sort processing device.
Figure 21:
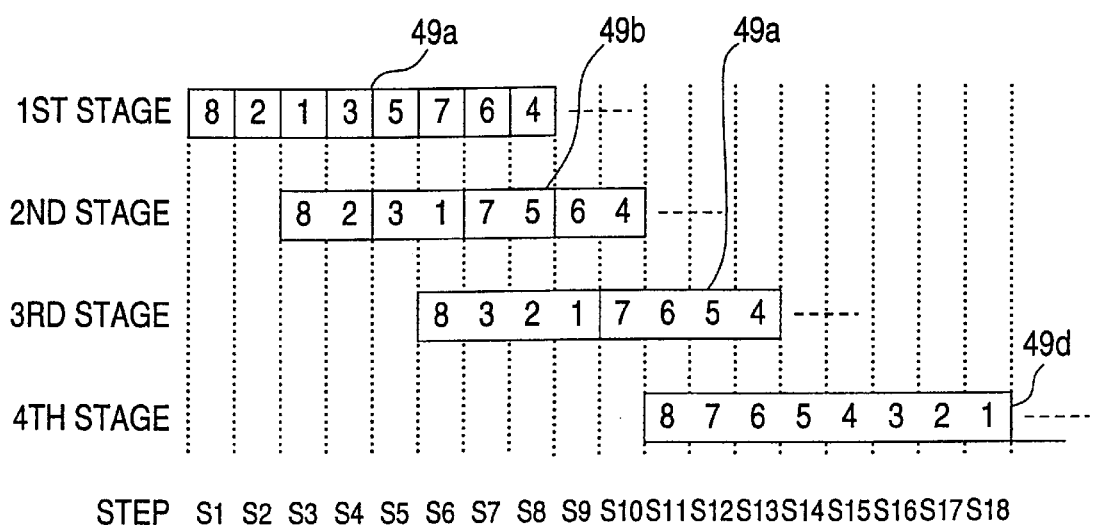
FIG. 21 is a diagram explaining the flow of data in conventional sort processing.

Then, the operation proceeds to Step S21 to input the data of the job 0. This data is the data of the job step 1, and the inputted data is accumulated or processed consecutively by sort processors starting with a first-stage sort processor 41, as already described with reference to FIG. 20.

Then, in Step S22, all the data of the job step 1 (job 0) is stored in the sort processing device 4. At this time, the data of the job 1 is prepared on the write side as the write data 61.

Then, the operation proceeds to Step S23, and the writing of the data of the job step 1 of the job 1 is started on the write side of the sort processing device 4. Accordingly, at this time, the data of the job 0 and the job 1 are present in the sort processing device 4. Meanwhile, the outputting of the data of the job 0 is started on the read side of the sort processing device 4.

In Step S24, all the processing of the job step 1 of the job 0 is completed, and the data of the job 1 remains in the sort processing device 4.

Then, the operation proceeds to Step S25, and the writing of the data of the job 0 is started again on the write side of the sort processing device 4. The data of the job 0 is changed to the data of the job step 2. Meanwhile, the reading of the data of the job step 1 (job 1) is effected on the read side of the sort processing device 4.

In Step S26, all the processing of the job step 1 of the job 1 is completed.

Thereafter, sort processing is effected by alternately changing the jobs in the same way as described above.

Since there are cases where the jobs being handled are different on the write side and the read side as in the aforementioned Steps S23 and S25, there is a problem in that the database processing device 3 for controlling the sort processing device 4 and the controller 2 cannot simply change the jobs they handle.

In the present invention, the above-described problem is solved by managing the processing using the sort processing device 4 separately for the processing (job) of writing data into the sort processing device 4 and for the processing (job) of reading data from the sort processing device 4. Here, it is possible to arbitrarily determine which job is to be selected as an ensuing write-side job, but the read-side job is restricted to the job being processed by the final-stage sort processor (the fourth-stage sort processor in the case of the sort processing device 4 shown in FIG. 20) in the sort processing device 4.

On the other hand, the database processing device 3 does not have such a time lag between the write side and the read side, and it is necessary to allocate an identical job to both of these sides. This difference between the two cases is shown in FIGS. 6 and 7.

Figure 6:
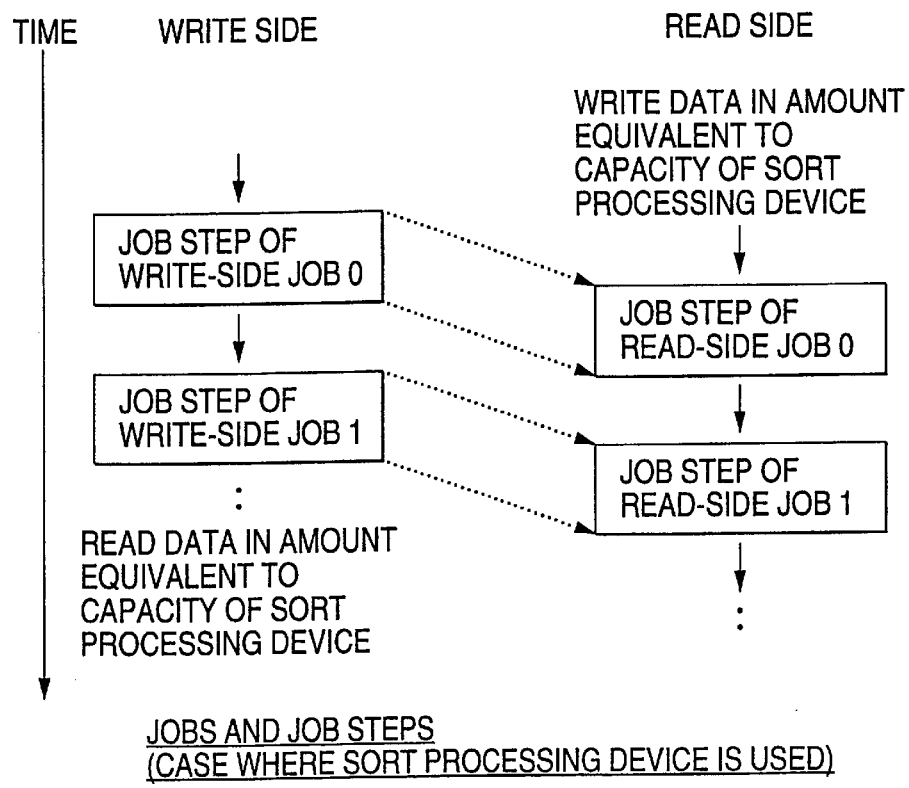
FIG. 6 is a diagram explaining input/output timings of job steps in a case where the sort processing device is used in the first embodiment of the present invention.
Figure 7:
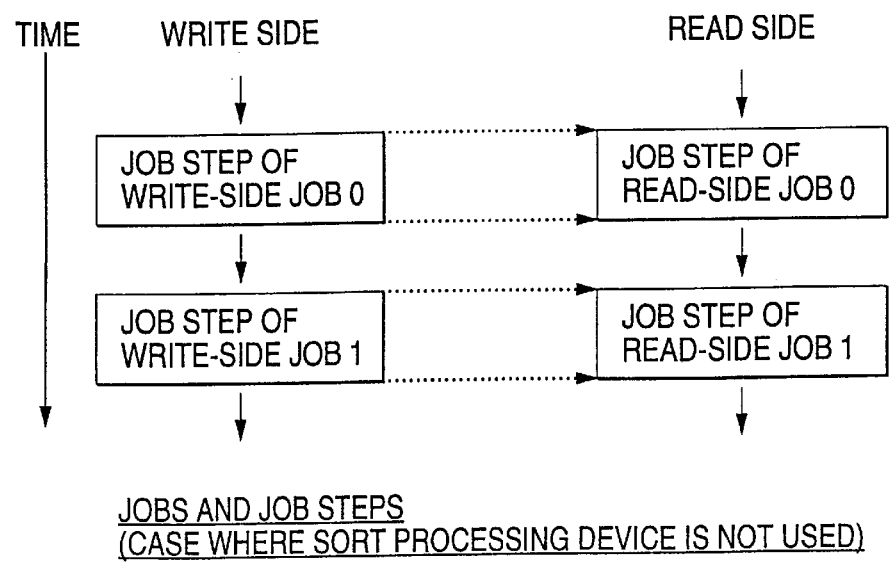
FIG. 7 is a diagram explaining input/output timings of job steps in a case where the sort processing device is not used in the first embodiment of the present invention.

FIG. 6 shows the relationship between jobs controlled by the controller 2 in a case where the sort processing device 4 is used. In the case where the sort processing device 4 is used, sort processing is effected in the sort processing device 4 in the manner of a pipeline, and it takes time until the sorted data is outputted from the final-stage sort processor. Hence, as shown in FIG. 6, there occurs the phenomenon that jobs on the write side and the read side differ.

In contrast, in the case where processing is effected by the database processing device 3 without using the sort processing device 4, processing is not effected in the manner of a pipeline. For this reason, as shown in FIG. 7, the job on the read side and the job on the the write side are the same, and the data of an ensuing job step is not read from the write side while the result of processing of one job step is being outputted to the read side. Namely, the database processing device 3 executes only one job at a given point of time. For this reason, there are no cases where the job on the read side and the job on the write side differ.

(However, in a case where the database processing device 3 is configured by a plurality of processors, a configuration may be provided such that the processing on the read side differs from the processing on the write side.)

Control of Changeover of Job

Actually, these two kinds of processing (processing which uses the sort processing device 4 and processing which does not) are combined and are executed in an arbitrary order, so that control of input and output is required in correspondence with the types of processing.

For this reason, processing is controlled in accordance with the following rules of control.

Determination of a Job Boundary and a Job Step Boundary by the Multiprocessing Control Unit 20

1) The multiprocessing control unit 20 determines a job start, a job end, and a job step end on the basis of an end state which is returned by the input-data processing control unit 21 or the output-data processing control unit 22 itself upon completion of the processing of an input/output command. That is, when the input-data processing control unit 21 or the output-data processing control unit 22 has transmitted JSEND or JBEND upon completion of the processing of an input/output command, the multiprocessing control unit 20 which has received the same determines the ending of the relevant job step or the relevant job.

2) In addition, the multiprocessing control unit 20 monitors the time allocated to each job step, and when the time is over (a slice is over), the multiprocessing control unit 20 sends JSEND as a flag at the time of delivering an input/output command following the present job step. This suggests the aborting of a job step commanded by the multiprocessing control unit 20 with respect to the input-data processing control unit 21 or the output-data processing control unit 22.

Management of the State of a Job by the Input-Data Processing Control Unit 21 or the Output-Data Processing Control Unit 22

3-1) Determination of completion of a job step

Upon determining that a job step boundary has been reached, the input-data processing control unit 21 or the output-data processing control unit 22 sets JSEND as a state at the time of completion of command processing. This includes the following two cases.

(1) A case where data input processing using the sort processing device 4 is being executed on the write side, and the inputting to the sort processing device 4 of the data, which has reached a maximum processing capacity of the sort processing device 4, has been completed (whereupon an end mark is attached to the end of the data inputted to the sort processing device 4)

(2) A case where data output processing using the sort processing device 4 is being executed on the read side, and an end mark is detected in the data from the sort processing device 4

3-2) Determination of completion of a job

When the input-data processing control unit 21 or the output-data processing control unit 22 has received a close command, a determination is made that the job has been completed. The input-data processing control unit 21 or the output-data processing control unit 22 sends JBEND upon completion of the processing of the input/output command.

Control of the Changeover of a Job and a Job Step by the Input-Data Processing Control Unit 21 or the Output-Data Processing Control Unit 22

When the input-data processing control unit 21 or the output-data processing control unit 22 has received JSEND from the multiprocessing control unit 20, the input-data processing control unit 21 or the output-data processing control unit 22 operates as follows.

(1) In the case where the sort processing device 4 is not used (the case where the merge processing or the like of data is effected only by the database processing device 3)

In this case, the job (step) is instantly changed over. Both the read side and the write side unfailingly follow the instruction.

(2) In the case where the sort processing device 4 is used

If the output-data processing control unit 22 (read side) detects a JSEND flag before detecting end data, and if the present job step is ended in accordance with the JSEND before the present job step is completed, three or more pieces of job data would remain in the sort processing device 4. Accordingly, the read side unfailingly ignores this instruction, and executes the job step till the end, and changes over the job (step) upon completion thereof.

Meanwhile, if the input-data processing control unit 21 (write side) ignores the JSEND flag, the job cannot be changed over when the write-side load is heavy due to complicated selection processing or the like. Hence, the write side unfailingly follows the instruction, interrupts the present job (step), and changes the job (step) over to an ensuing one.

Discarding of Data in Sort Processing Device 4

1) Processing by the input-data processing control unit 21 and the output-data processing control unit 22 at the time of occurrence of an error or cancellation For instance, it is now assumed that two jobs are present in the sort processing device 4, and that the job 0 is being processed on the write side, while the job 1 is being processed on the read side. At this time, if it is assumed that the CPU 7 has sent a cancel command for cancelling the job 0, and that it has hence become necessary to forcibly end the job 0, since the data of the canceled job 0 remains in the sort processing device 4, there arises a need to discard the unnecessary data of the job 0.

The cancellation is effected by issuing a close command midway in the processing. Upon receiving the close command at a point of time when the processing is not yet completed, the input-data processing control unit 21 or the output-data processing control unit 22 returns JBEND (the job is ended)+CAN (cancellation has been issued) as an end state so as to end the job.

In the event that an error has occurred, processing is carried out as follows.

a) In the event that an error has occurred upon issuance of an open command, the input-data processing control unit 21 or the output-data processing control unit 22 issues an error report, and then ends the processing concerning that job. At that time, the end state reported to the multiprocessing control unit 20 is JBEND +ERR (occurrence of error).

b) In the event that an error has occurred upon the issuance of an xfer command, the input-data processing control unit 21 or the output-data processing control unit 22 reports JSEND (the job step is ended)+ERR to the multiprocessing control unit 20 as an end state, and then waits for a close command. The xfer command which is received while waiting for the close command is ignored.

c) In the event that an error has occurred upon the issuance of a close command, the input-data processing control unit 21 or the output-data processing control unit 22 reports the error to the multiprocessing control unit 20, and ends the processing. At this time, the end state JBEND+ERR is reported.

2) Discarding of data in the sort processing device 4 subsequent to the occurrence of an error or cancellation For instance, a case is assumed in which the job step 1 of the job 0 is being processed on the read side, while the job step 2 of the same job 0 is being processed on the write side. At this time, even if an error is detected in the processing of the job step 1 on the read side, and the data of the job step 1 is discarded by the multiprocessing control unit 20, the job step 2 is processed on the write side, so that the data of the job 0 remains in the sort processing device 4. There arises a need to further discard this data on the read side.

The input-data processing control unit 21 or the output-data processing control unit 22 which has detected an error or cancellation returns the aforementioned end state to the multiprocessing control unit 20. When the multiprocessing control unit 20 detects that state in a job step boundary, the multiprocessing control unit 20 sets a flag for indicating that the subsequent xfer commands are to be ignored in processing input/output commands issued to the relevant unit. In addition, the multiprocessing control unit 20 sets a similar state with respect to the other unit of the pair of the relevant unit which constitute the job. When input/output commands with this flag set is delivered to the input-data processing control unit 21 or the output-data processing control unit 22, the input-data processing control unit 21 or the output-data processing control unit 22 unconditionally ignores them other than the close command. Consequently, when one unit of the pair is stopped, the other unit of the pair handles the xfer commands as NOP up until the close command is received.

When an error has occurred during sorting on the read side, if the data is one concerning which the relevant job step is being read, the read side of the output-data processing control unit 22 discards this data from the sort processing device 4 until the detection of the end data, and ends the relevant job step. Similarly, when an error has occurred during sorting on the write side, the input-data processing control unit 21 immediately inputs an end mark to the sort processing device 4, and stops the inputting of subsequent data. Consequently, at the end of the relevant job step, it is ensured that only the data written by the write side remains inside the sort processing device 4.

After the end of the job step in which the error has occurred, in the case where the error has occurred on either the read side or the write side, the multiprocessing control unit 20 in its own responsibility discards the data remaining in the sort processing device 4 after being written by the write side, as necessary. (If an error has occurred on the read side, the read data is already discarded as described above. Here, the data written by the write side in an ensuing job step is discarded.) From the table below, it is possible to understand cases where discarding by the multiprocessing control unit is required.

TABLE 1

| Write-side job | Read-side job | Occurrence of error | Discarding in ensuing job step |
|---|---|---|---|
| 0 | 0 | write | required |
| 0 | 0 | read | required |
| 0 | 0 | write & read | required |
| 1 | 0 | write | required |
| 1 | 0 | read | not required |
| 1 | 0 | write & read | required |

Hereafter, on the basis of the above-described concept, the operation of the multiprocessing control unit 20 will be described with reference to FIGS. 8 to 11, the operation of the input-data processing control unit 21 will be described with reference to FIG. 12, and the operation of the output-data processing control unit 22 will be described with reference to FIG. 13.

Figure 8:
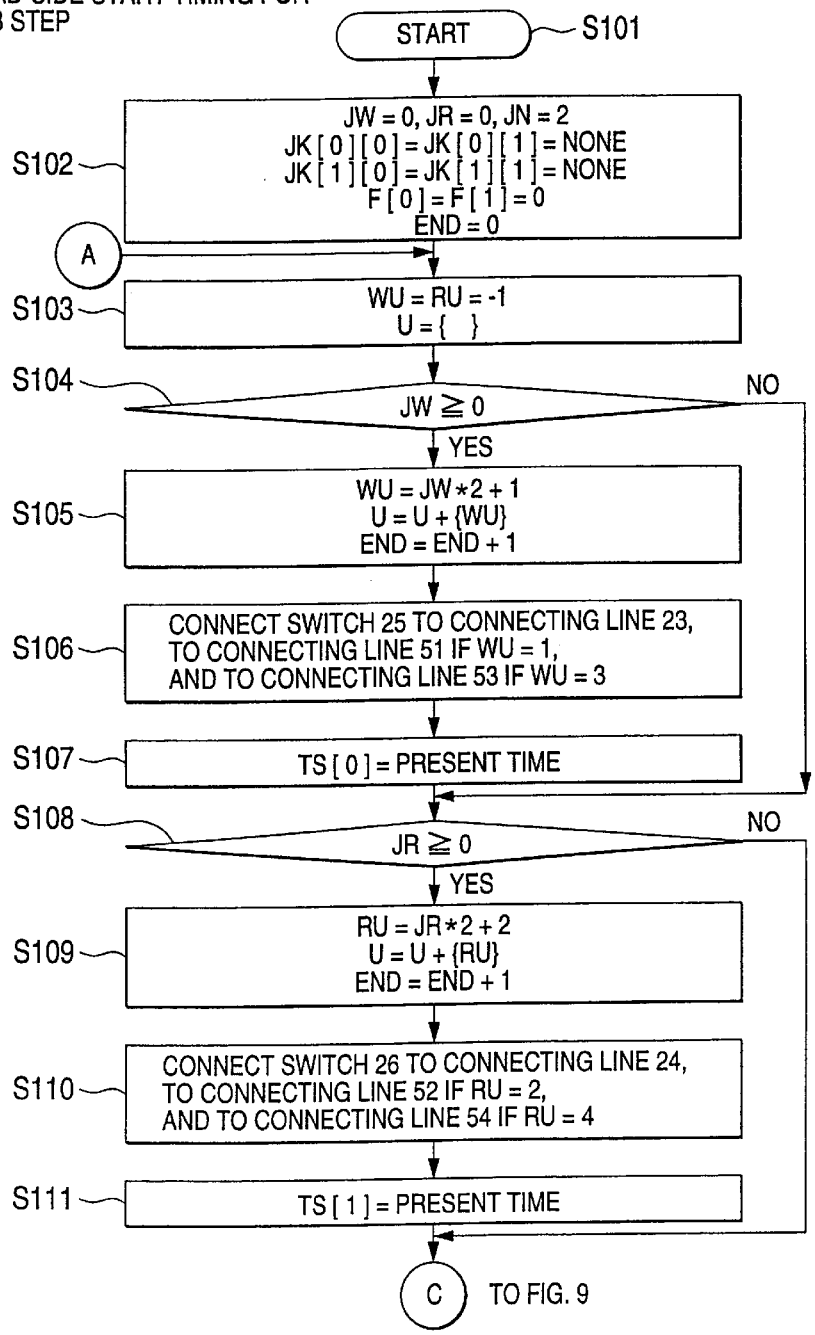
FIG. 8 is a first flowchart explaining the operation of a multiprocessing control unit in the first embodiment of the present invention.

FIG. 8: Part 1 of the Operation of Multiple-Processing Control Unit

Figure 9:
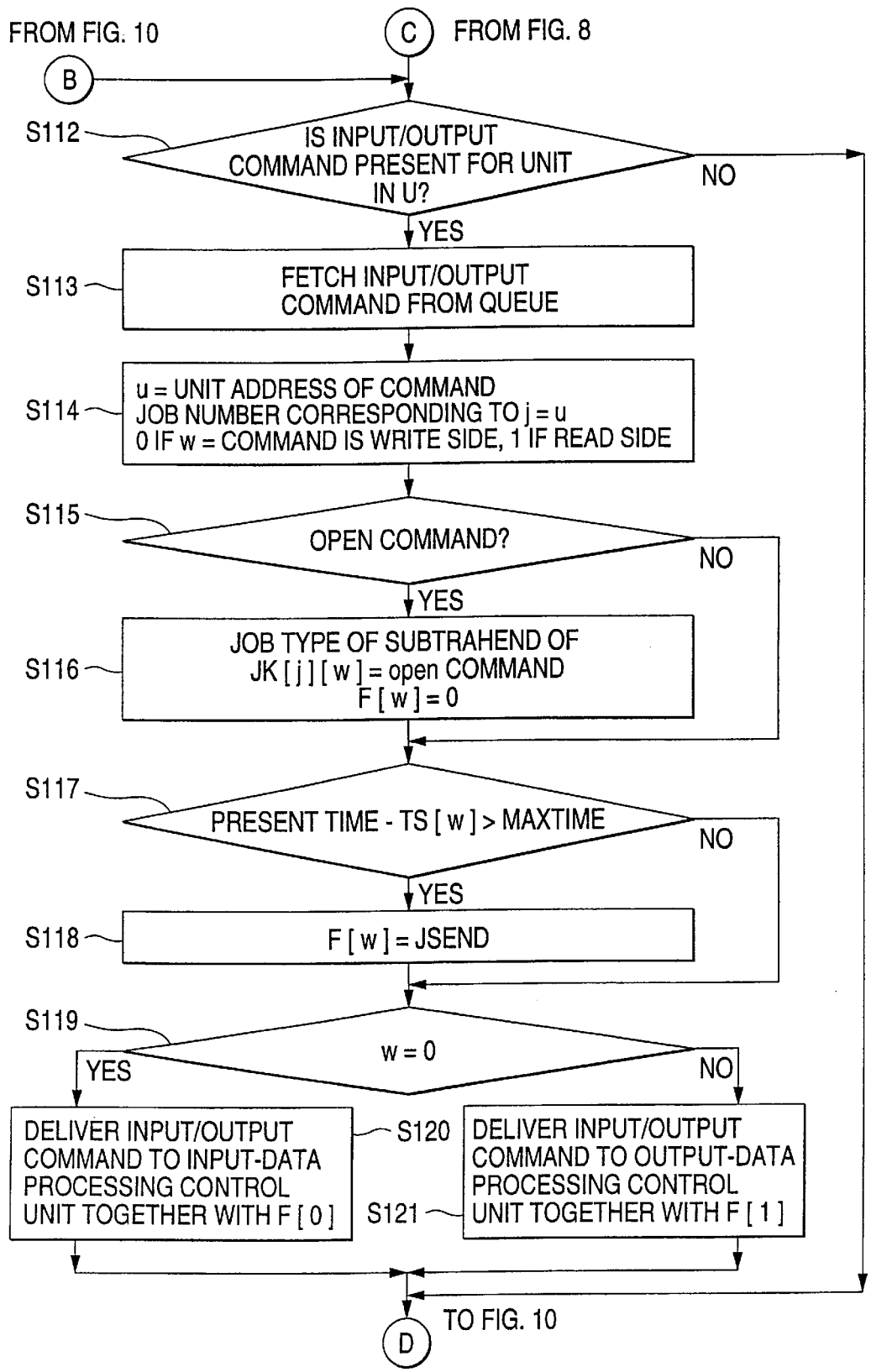
FIG. 9 is a second flowchart explaining the operation of the multiprocessing control unit in the first embodiment of the present invention.
Figure 10:
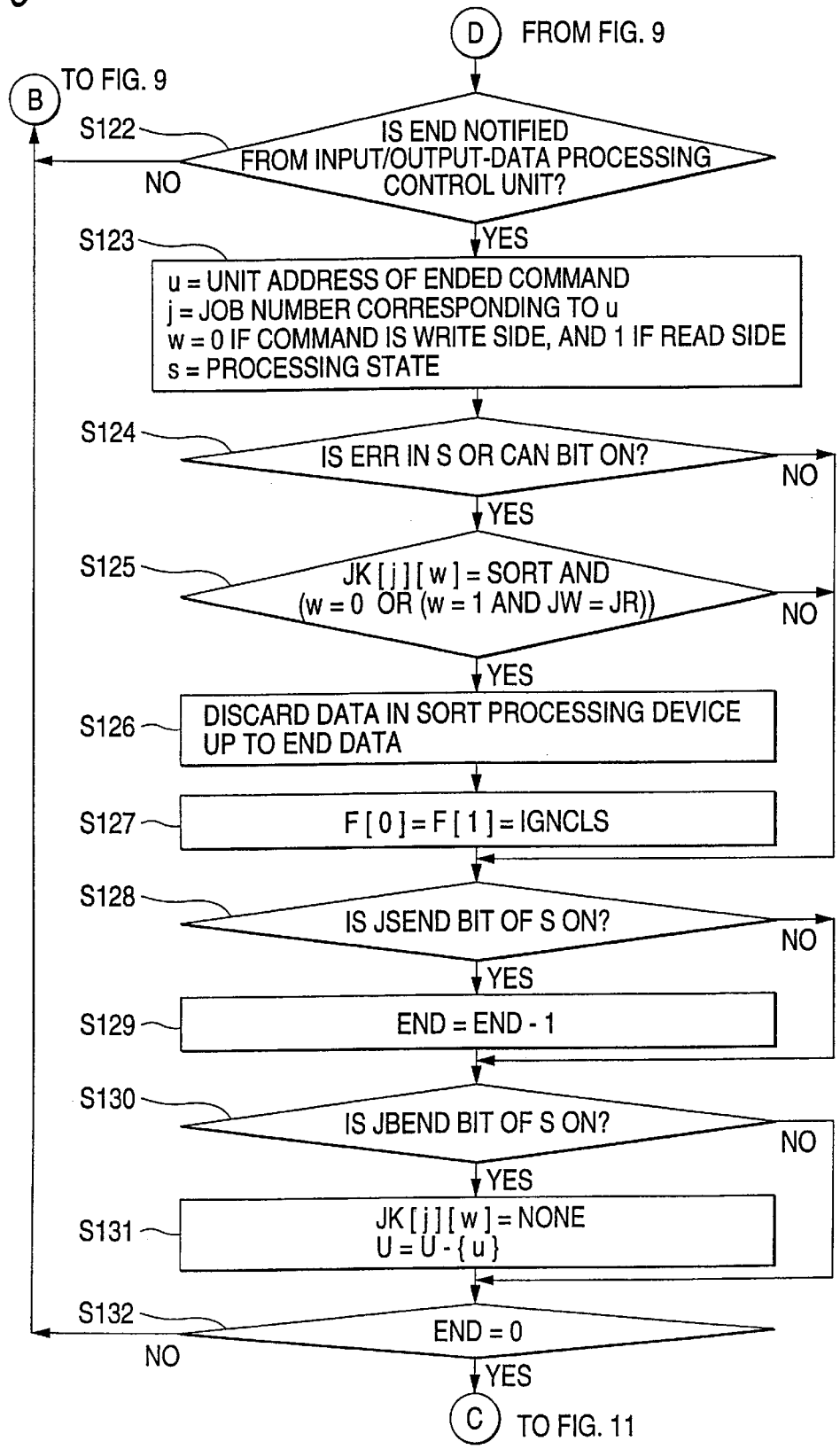
FIG. 10 is a third flowchart explaining the operation of the multiprocessing control unit in the first embodiment of the present invention.

FIGS. 8 to 10 are flowcharts explaining the operation of the multiprocessing control unit 20. First, a description will be given of the definition of the variables used in the flowcharts.

JW: identifier No. of the present write-side job j: identifier No. of the job to be executed next on the write side JR: identifier No. of the job to be executed next on the read side JN: number of jobs WU: data-input unit address for actual transmission and reception of data to and from CPU 7

RU: data-output unit address for actual transmission and reception of data to and from CPU 7

TS[0]: write-side start timing for a job step

TS[1]: read-side start timing for a job step

F[0]: flag to be sent to the input-data processing control unit

F[1]: flag to be sent to the output-data processing control unit

END: job-step-end counter

U: unit subject to processing JK[job][read side/write side]: kind of job JK[0][0]: kind of job on the write side of the job 0

JK[1][0]: kind of job on the write side of the job 1

JK[0][1]: kind of job on the read side of the job 0

JK[1][1]: kind of job on the read side of the job 1

Although the kinds of jobs on the read side and the write side are the same for each job, since points of end time of processing generally differ for the kinds of jobs, the kinds of jobs are held separately. The kinds of jobs include "none," "sort," and "other than sort." "None" means that there is no processing in the relevant job number, i.e., the relevant job number is in an unused state. "Sort" means that a job which uses the sort processing device is being executed in correspondence with the relevant job number. "Other than sort" means that a job (combination, merge, etc.) which does not use the sort processing device is being executed in correspondence with the relevant job number.

Next, a description will be given of the operation.

First, when the operation is started in Step S101, the multiprocessing control unit 20 effects the initialization of the variables in Step S102. It is assumed that when multiprocessing is set by the CPU 7, and processing is started with two degrees of multiprocessing, the multiprocessing control unit 20 sets JW and JR to 0, and effects the processing of the job 0 on both the write side and the read side immediately after the start. In addition, JN is initialized to 2 in terms of the number of degrees of multiprocessing. It should be noted that there are cases where JW and JR assume negative values hereafter, but it indicates that a corresponding job is not present. Flags F[0] and F[1] sent to the input-data processing control unit 21 and the output-data processing control unit 22 are respectively initialized to 0.

Next, the operation proceeds to Step S103 to initialize the data-input unit variable WU, the data-output unit variable RU, and the variable U of the unit subject to processing.

Subsequently, the operation proceeds to Step S104 to check whether or not a present write-side job is present. If JW≧0, the operation proceeds to an ensuing Step S105. If JW is a negative value, a write-side job is not present, so that the operation jumps to Step S108 to effect the read-side processing.

In Step S105, a write-side unit address corresponding to the job selected for the job step to be executed next is set with respect to the data-output unit variable RU. These calculations can be obtained by the evaluation of a simple formula which will be explained below. In addition, unit address subject to processing are consecutively stored as the variable U for storing the unit adresses.

The relationship between the unit address and the job number is provided such that the job 0 is executed by the set of the units 1 and 2, while the job 1 is executed by the set of units 3 and 4. Accordingly, the write-side unit with respect to a job J can be calculated by J*2+1. In addition, the job number of the job to which the write-side unit WU belongs can be calculated by (WU−1)/2. Since the correspondence between the job number and the unit number can be calculated simply, a simplified description, such as "a corresponding job number" and "a corresponding unit number," is sometimes given hereafter.

In addition, END, which is a job-step-end counter, is incremented by 1 so as to record that a write-side job step has been scheduled. This is to discriminate that there are three kinds of job steps, e.g., a job step executed only on the read side, a job step executed only on the write side, and a job step executed on both the read side and the write side.

Next, the operation proceeds to Step S106 in which a connecting line corresponding to the unit set as the data-input unit variable WU is connected to the connecting line 23 by means of the switch 25.

For instance, if the job 0 is selected for JW, the data-input unit variable WU=JW*2+1=1, so that the unit 1 is selected as WU. In addition, the switch 26 is changed over to the connecting line side corresponding to WU, and the connecting line 51 is connected to the input-data processing control unit 21.

As another example, if the job 0 is selected for JW, the data-input unit variable WU=1, and the connecting line 51 is connected to the input-data processing control unit 21.

Subsequently, in Step S107, the present time is set as TS[0]. This is a preparation for measuring the time elapsed from the start of the job step.

Then, the operation proceeds to Step S108. Steps S108 to Sill provide processing for the read side.

First, in Step S108, a check is made as to whether or not a read-side job is present. When JR≧0, a determination is made that a job is present, and the operation proceeds to Step S109. Meanwhile, when JR is a negative value, read-side processing is not present, so that the operation jumps to Step S112 in FIG. 9.

In Step S109, a read-side unit address corresponding to the job selected for the job step to be executed next is set with respect to the data-output unit variable RU. These calculations can be obtained by the evaluation of a simple formula which will be explained below. In addition, unit addresses subject to processing are consecutively stored as the variable U for storing the unit addresses.

The read-side unit with respect to the job J can be calculated by J*2+2. In addition, the job number of the job to which the read-side unit RU belongs can be calculated by (RU−2)/2.

In addition, END, which is the job-step-end counter, is incremented by 1 so as to record that a read-side job step has been scheduled.

Next, the operation proceeds to Step S106 in which a connecting line corresponding to the unit set as the data-output unit variable RU is connected to the connecting line 24 by means of the switch 26.

For instance, if the job 0 is selected for JW, then JR=JR*2÷2=2, so that a value indicating the unit 2 is substituted for the data-output unit variable RU. In addition, the switch 26 is changed over to the connecting line side corresponding to RU, and the connecting line 52 is connected to the output-data processing control unit 22.

As another example, if the job 1 is selected for JR, the data-output unit variable RU=4, and the connecting line 54 is connected to the output-data processing control unit 22.

Subsequently, in Step S111, the present time is set as TS[1]. This is a preparation for measuring the time elapsed from the start of the job step.

FIG. 9: Part 2 of the Operation of Multiple-Processing Control Unit

Next, the operation proceeds to Step S112 in FIG. 9 to start the execution of the job step.

First, in Step S112, an input/output command corresponding to either RU or WU is searched from a corresponding queue. This is effected as an input/output command with respect to the unit indicated by the variable U of the unit subject to processing is searched from the queue. Then, a determination is made as to whether or not an input/output command with respect to the unit indicated by the variable U is present. If this input/output command is present, the operation proceeds to Step S113, and if not, the operation jumps to Step S122 in FIG. 10 to effect the processing for ending the job step.

In Step S113, the input/output command searched in Step S112 is fetched from the queue.

Next, the operation proceeds to Step S114 in which the unit to which each of the fetched commands belongs, the number of the job corresponding to the command, and a distinction between the write side and the read side are stored in u, j, and w, respectively.

Subsequently, the operation proceeds to Step S115 to determine whether the command fetched in Step S113 is an open command. If it was the open command, the operation proceeds to an ensuing Step S116, and if not, the operation jumps to Step S122 in FIG. 10.

In Step S116, the kind of processing of the job designated as an argument in the open command is stored in JK[j][w]. In addition, the value of a relevant side (read side/write side designated by w) of a flag F instructing control with respect to the input-data processing control unit 21 or the output-data processing control unit 22 is initialized to 0.

The above operation starts the relevant job. Next, in Step S117, a check is made as to whether or not a prescribed maximum job-step execution time (MAXTIME) is exceeded or not. This is carried out by making a comparison between the time elapsed from the time recorded in Step S111 and MAXTIME.

If MAXTIME has been exceeded, the operation proceeds to an ensuing Step S118, and if not, the operation jumps to Step S119.

In Step S118, since it was determined in Step S117 that MAXTIME had been exceeded, the flag JSEND is set in the flag F[w]. This is effected to notify the end of execution of the job step to the input-data processing control unit 21 or the output-data processing control unit 22.

When the above-described preliminary processing is completed, the operation proceeds to Step S119 in which the operation branches depending on whether the job step being presently executed concerns write-side processing or read-side processing. In the case of the write-side processing, the operation proceeds to Step S120 to deliver the input/output command fetched in Step S113 to the input-data processing control unit 21 together with the flag F, and to instruct the input-data processing control unit 21 to execute the input/output command.

Meanwhile, in the case of the write-side processing, the operation proceeds to Step S121 to deliver the input/output command to the output-data processing control unit 22 together with the flag F, and instruct the output-data processing control unit 22 to execute the input/output command.

After Step S120 or S121 is completed, the operation proceeds to Step 122 in FIG. 10.

FIG. 10: Part 3 of the Operation of Multiple-Processing Control Unit

Next, in Step 122, a check is made as to whether or not the input-data processing control unit 21 or the output-data processing control unit 22 has completed the processing of the input/output command delivered thereto in Step S120 or S121. Since the input-data processing control unit 21 or the output-data processing control unit 22 sends an end notice upon completion of the execution of the input/output command, a check is made as to whether or not this end notice has been received.

If the end notice has not been received, the operation returns to Step S112 in FIG. 9, a check is made as to whether or not the input/output command has arrived again at the unit indicated by the variable U of the unit subject to processing, and processing is effected with respect to an ensuing input/output command. For example, in the case of the job step for processing on both the write side and the read side, after the execution of the write-side command is started, and the operation proceeds to the processing of the read-side command in the above-described manner.

When the end notice has been received, the operation proceeds to an ensuing Step S123 to effect the processing for ending the job step.

In Step S123, the unit to which the ended command belongs, the number of the job corresponding to the command, and a distinction between the write side and the read side are stored in u, j, and w, respectively. In addition, the state of the processed result is stored in s.

Next, the operation proceeds to Step S124 to check whether an ERR bit or a CAN bit has been set in s.

Here, if it is determined that an ERR bit or a CAN bit has been set, the operation proceeds to an ensuing step S125. If it is determined that neither of these bits has been set, the operation skips the processing at the time of abnormality starting in Step S126, and proceeds to Step S128.

When the operation has proceeded to the processing of Step S125, it means that the input/output command has been ended due to an error or cancellation. In Step S125, a determination is made as to whether or not the present job step concerns the processing using the sort processing device 4 and the write-side processing, or whether the present job step concerns the processing using the sort processing device 4 and the read-side processing, and whether the jobs on the write side and the read side are identical.

Here, if the aforementioned two cases apply, the operation proceeds to an ensuing Step S126 to effect discarding. If the aforementioned two cases do not apply, the discard processing is skipped, and the operation proceeds to Step S128.

In Step S126, the data remaining in the sort processing device 4 is discarded until the detection of the end-data mark.

Subsequently, in Step S127, the flags F are set for the write side and the read side, and IGNCLS flags are set for them, thereby instructing the input-data processing control unit 21 and the output-data processing control unit 22 to ignore commands other than the close command.

Then, the operation proceeds to Step S128 to check whether or not the JSEND bit of the end-state variable s is on. If it is on, the processing of the corresponding write-side or read-side job step has been completed, so that the job-step-end counter END is decremented by 1, and the operation proceeds to Step S130. In addition, if JBEND of s is off, the operation jumps directly to Step S130.

In Step S130, a check is made as to whether or not the JBEND bit of the end-state variable s is on. Here, if it is on, it means that the write-side or read-side job has been ended by the execution of a close command. Therefore, in Step S131, that state JK[j][w] is set as "none," and a corresponding unit is removed from the variable U of the unit subject to processing. Here, as a convention between the multiprocessing control unit 20 on the one hand, and the input-data processing control unit 21 and the output-data processing control unit 22 on the other, it is assumed that the rule that when JBEND is on, JSEND is also unfailingly set in the on state is to be observed. When Step S131 is completed, the operation proceeds to Step S132.

Meanwhile, also when it is determined in Step S130 that s is off, Step S131 is skipped, and the operation proceeds to Step S132.

In Step S132, a determination is made as to whether or not the job-step-end counter END has been set to 0. If END has been set to 0, it means that the processing of the job step has been completed on both the write side and the read side, so that the operation proceeds to Step S133 for scheduling an ensuing job step. If END has not been set to 0, the operation returns to Step S112 in FIG. 9 to fetch an input/output command.

Figure 11:
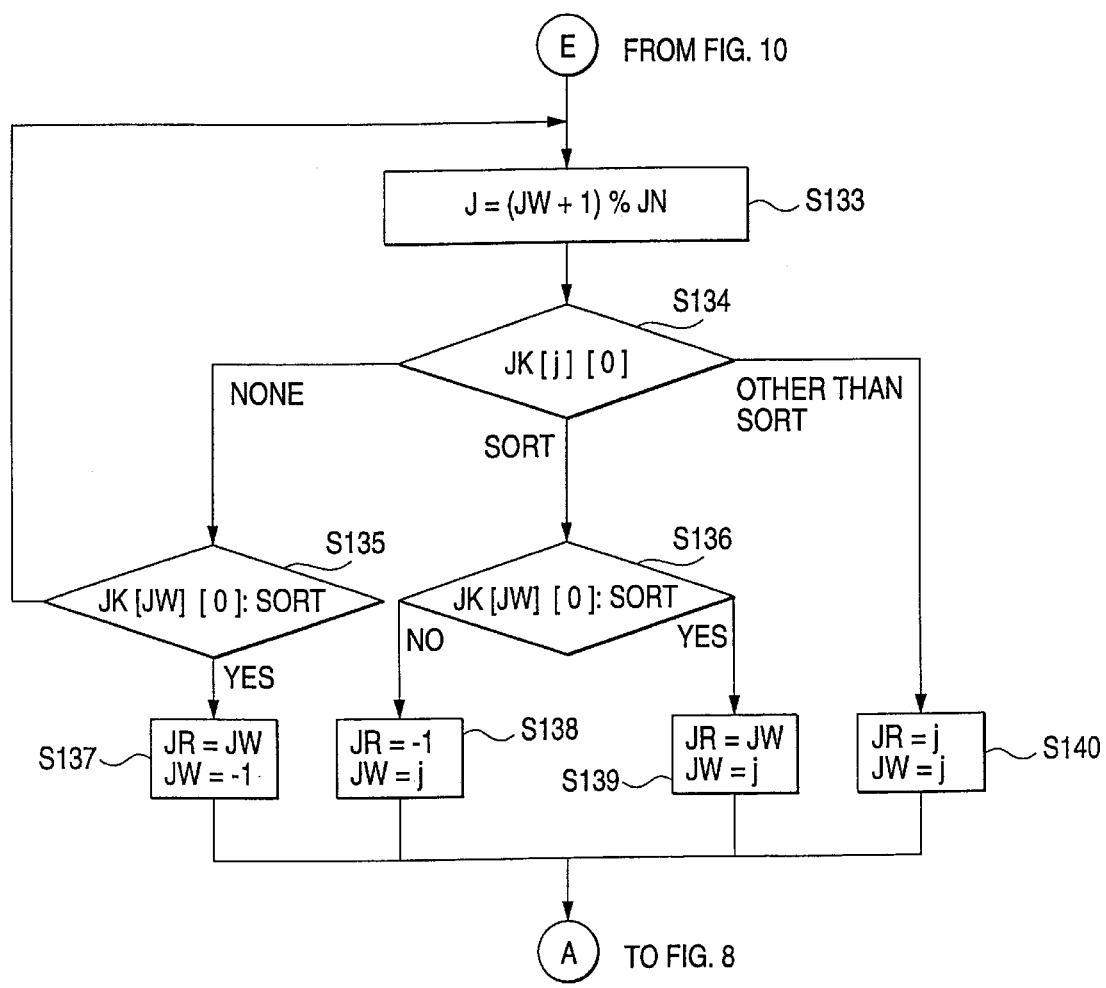
FIG. 11 is a fourth flowchart explaining the operation of the multiprocessing control unit in the first embodiment of the present invention.

FIG. 11: Part 4 of the Operation of Multiple-Processing Control Unit

Starting in Step S133 in FIG. 11, processing is effected for reallocating the job which is in the process of being presently executed and the execution of which is temporarily suspended. First, to allocate the job to the write side, in Step 133, the job number which has been cyclically selected is set for j. The cyclical selection can be determined by adding 1 to the present JW and by calculating the remainder obtained by dividing the result of addition by JN. Here, % in the drawing indicates that the remainder of the result of subtraction is calculated.

Next, in Step S134, the kind of the job corresponding to j is determined by checking JK[j][0], and the next job number JR and JW are determined as follows depending on how the sort processing device 4 was operated immediately before.

First, if it is determined in Step S134 that JK[j][0] is "NONE," the operation proceeds to Step S135; if it is determined that processing is sort processing, the operation proceeds to Step S136; if it is determined that processing is other than sort processing, the operation proceeds to Step S140.

First, a description will be given of Step S135, which is the processing of a case in which a job corresponding to j has not yet been allocated. In Step S135, a check is made as to whether or not data still remains in the sort processing device 4. Since this check can be made depending on whether the kind of the immediately preceding job was sort, a check is made as to whether or not JK[JW][0] is sort. If it is not sort, data does not remain in the sort processing device 4, and a request for processing has not been received for j, so that the operation returns to Step S133 which is the procedure for cyclical selection for selecting a candidate for an ensuing job.

If the kind of the immediately preceding job was sort processing, in Step S137, the immediately preceding job is allocated to JR so as to read the data in the sort processing device 4. JW is set to −1, and no processing is allocated thereto.

Then, if Step S137 is completed, the operation returns to Step S103 in FIG. 8 so as to start the execution of the job step allocated to JR.

Next, to describe Step 136, this is the case where the job to be executed is sort processing. First, in Step S136, a check is made as to whether or not data remains in the sort processing device 4.

If the job to be executed is not sort processing, data does not remain in the sort processing device 4. Consequently, the operation proceeds to Step S138 to set JR =−1 and JW=j, and an instruction is given to execute the job concerning j selected in Step S133.

If it is determined in Step S136 that data remains in the sort processing device 4, the operation proceeds to Step S139 to set JR=JW, and the read side executes the immediately preceding job. Further, JW=j is executed, and an instruction is given to execute the job concerning j which has been selected in Step S133 on the write side.

After the completion of Step S138 or Step S139, the operation returns to Step S103 in FIG. 8 to start the execution of the job steps designated for JW and JR.

After completion of Step S140, the operation returns to Step S103 in FIG. 8 to start the execution of the job steps designated for JW and JR.

Figure 12:
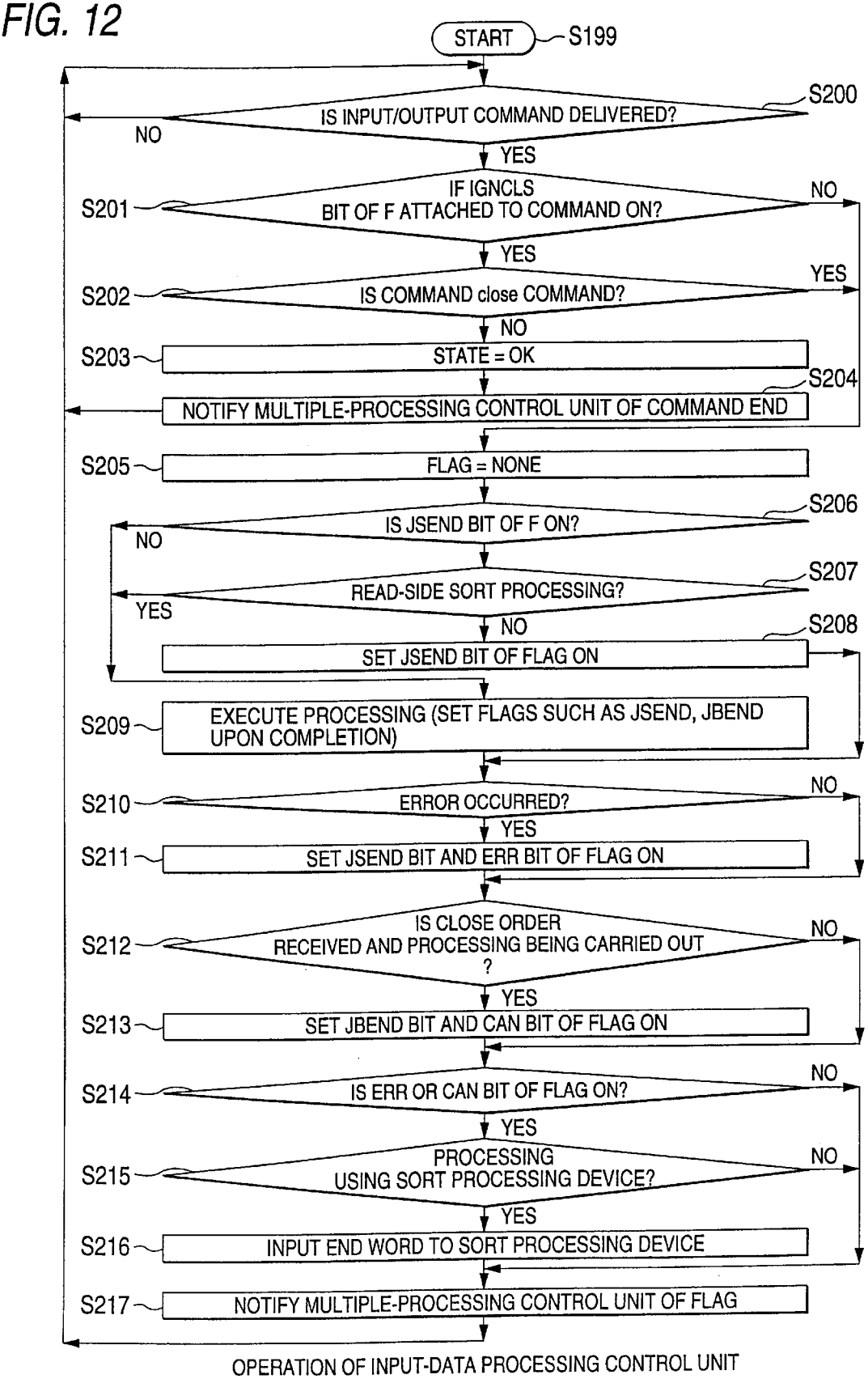
FIG. 12 is a flowchart explaining the operation of an input-data processing control unit in the first embodiment of the present invention.

FIG. 12: Operation of Input-Data Processing Control Unit 21

Referring next to FIG. 12, a description will be given of the operation of the input-data processing control unit 21.

The input-data processing control unit 21 starts its operation from Step S199, and first waits for the arrival of an input/output command from the multiprocessing control unit 20 in Step S200. That is, a check is made as to whether or not there has been an input/output command, and if there is none, the operation returns to Step S200 again to loop until the arrival of an input/output command.

In Step S201, the value of the flag F which is sent together with the input/output command is checked. Here, if the IGNCLS bit is on, the operation proceeds to Step S202, and if the bit is not on, the operation jumps to Step S205.

In Step S202, a check is made as to whether or not the input/output command is a close command. If it is the close command, the operation jumps to Step S205, and if it is not, the operation proceeds to Step S203 to set the end state as a normal end (OK). Then, in Step S204, the multiprocessing control unit 20 is notified of the end. Upon completion of Step S204, the operation returns to Step S200 to wait for the delivery of an input/output command from the multiprocessing control unit 20.

In Step S205, the internal flag FLAG is initialized.

Then, the operation proceeds to Step S206 to check whether or not the JSEND bit is on in the flag F sent from the multiprocessing control unit 20. Here, if the JSEND bit is on (this indicates that processing which exceeds a prescribed time is being carried out in the execution of the job step; refer to Steps S117 to S120 in FIG. 9), the operation proceeds to Step S207 to check whether or not the read-side processing is being carried out by the sort processing device 4. If YES is the answer in the determination, the present processing is executed in Step S209 without interrupting the processing. This is because processing cannot be interrupted in the read-side sort processing until the end data is read, so that the processing needs to be continued even after exceeding the time. If NO is the answer in the determination, the operation proceeds to Step S208 to temporarily interrupt the processing, and the JSEND bit is set to notify the end of the job step (finally, the multiprocessing control unit 20 is notified of the end of the job step in Step S217). Then, the operation proceeds to Step S210.

In Step S209, the designated processing, such as sort, combination, and merge, is executed by the database processing device 3 and the sort processing device 4. In particular, in the case of processing using the sort processing device 4 in processing with respect to an initial command of a job step, initialization data is first inputted to the sort processing device 4.

Figure 19:
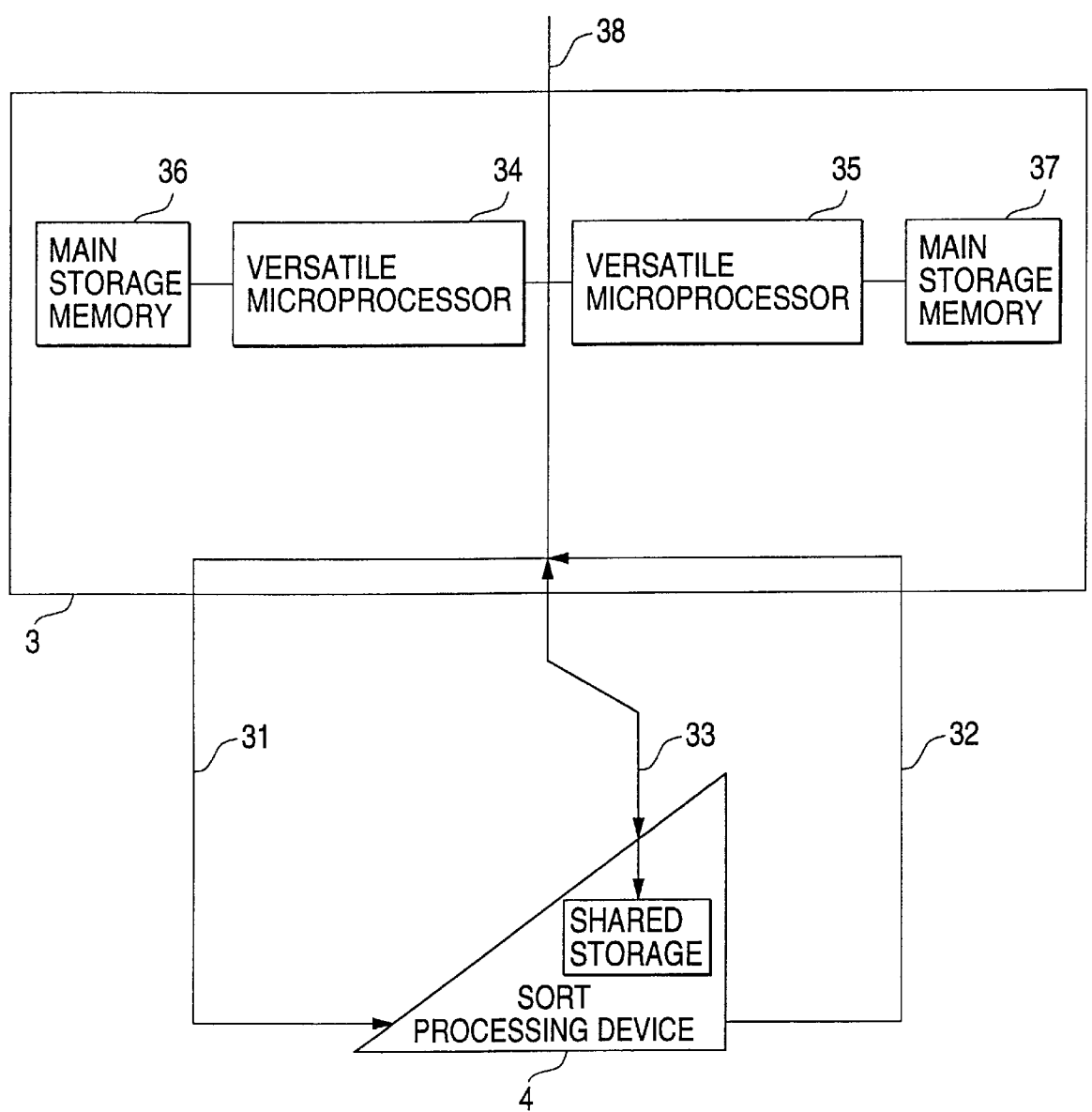
FIG. 19 is a functional block diagram illustrating the configuration of a conventional data processing device.

At this time, since requests for a multiplicity of processing operations are issued in mixed form, a plurality of programs in a number corresponding to the jobs are installed in the database processing device 3, and the database processing device 3 executes processing by invoking a program corresponding to a designated job among the programs. In the database processing device 3 having a configuration shown in FIG. 19, for example, the multiplicity of programs corresponding to jobs are stored in main storage devices 36 and 37, and are executed by microprocessors 34 and 35.

There are cases where data are inputted up to a limit of the capacity of the sort processing device 4 in the execution, with the result that an end of a job step and an end of a job are transmitted. In that case, in Step S309, JSEND, JBEND, and JSEND are set in FLAG to end the processing.

Here, a job step ends in the following cases:
1) When the sort processing device 4 is used:
    Write side: in a case where data is inputted to the input-data processing control unit 21 up to a limit of the capacity of the sort processing device 4

2) When the sort processing device 4 is not used:
    Write side: in a case where the xfer command is executed a plurality of times, and a fixed time is reached.

Among these cases, when the sort processing device 4 is used, on the write side the input-data processing control unit 21 writes end data and ends the job step by itself when data is inputted thereto up to the limit of the capacity of the sort processing device 4.

Thus, data strings which are inputted from the host computer are divided according to the capacity of the sort processing device or a designated time, and divided data substrings come to be present in mixed form over jobs, thereby carrying out multiprocessing.

In Step S209, it is assumed that in the case where a job step is ended on the write side in case 1) of the above-described cases, JSEND is set in the on state, thereby ending the job step. Further, if processing is that of a close command, JBEND is also set, thereby ending the job step.

Upon completion of the processing in Step S209, a determination is made in Step S210 as to whether or not an error has occurred in the course of processing. If the error has occurred, JSEND and ERR bits are set in FLAG in Step S211, and the operation proceeds to Step S212. Meanwhile, if no error occurred, the operation jumps directly to Step S212.

Next, in Step S212, if the input/output command is the close command, and processing thereof is being carried out, the JBEND bit and the CAN bit are set in FLAG in Step S213, and the operation proceeds to Step S214. Meanwhile, if the answer is determined to be NO in Step S212, the operation jumps directly to Step S214.

In Step S214, a check is made as to whether or not the ERR or CAN bit is on. If YES is the answer, a check is made in Step S215 as to whether or not a job step using the sort processing device 4 is being executed. If the answer is determined to be YES in Step S215, the operation proceeds to Step S216 to write the end word in the sort processing device 4, and the inputting of data to the sort processing device 4 forcibly ends in an ensuing Step S217.

On the other hand, if the answer is determined to be NO in Step S214 or S215, the operation jumps to Step S217 without writing the end word.

Finally, in Step S217, the FLAGs which were set in the above Steps S205 to 216 are outputted to the multiprocessing control unit 20 to notify the end state.

Then, the operation returns to Step S200 to wait for an ensuing input/output command.

Figure 13:
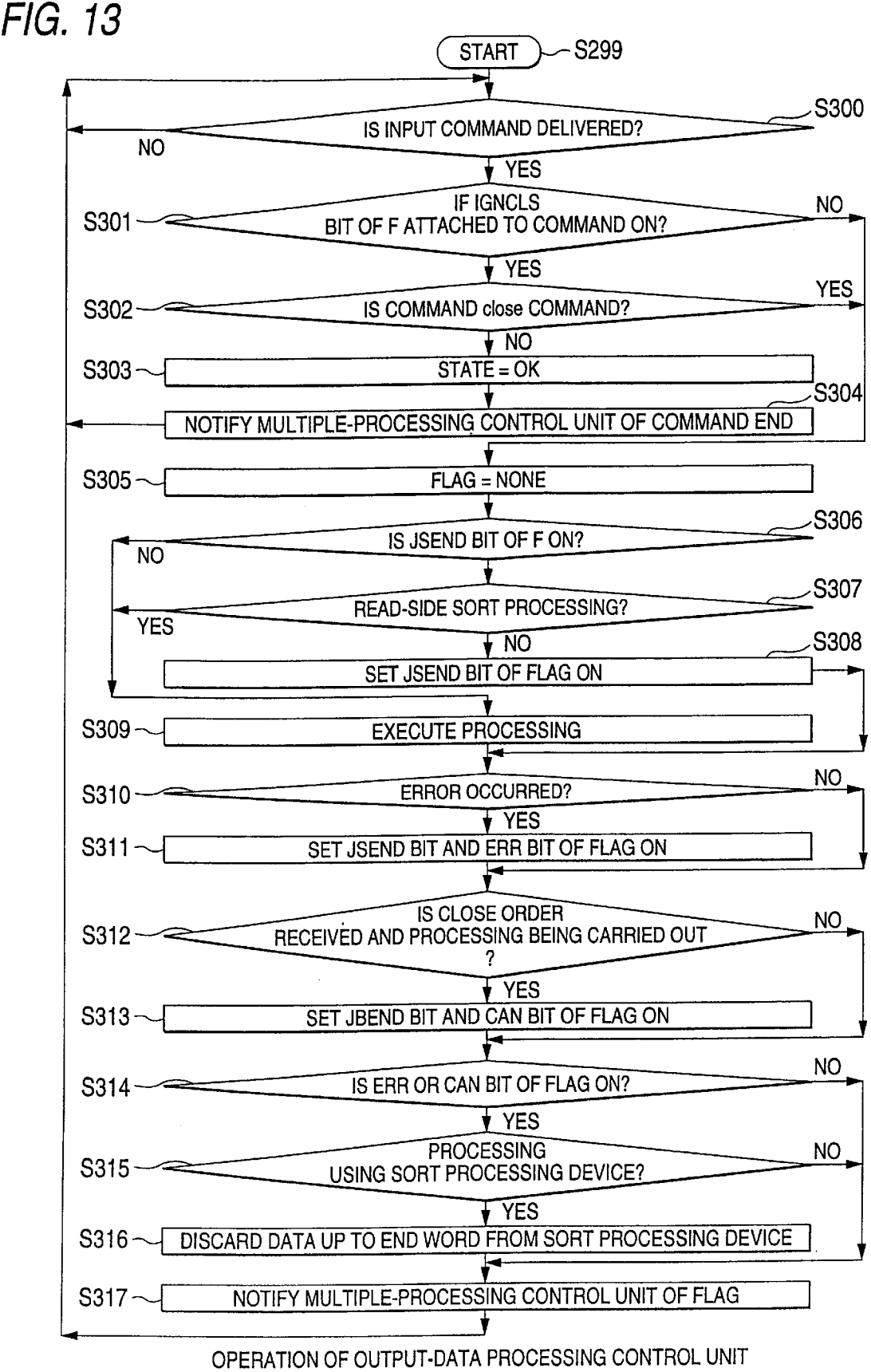
FIG. 13 is a flowchart explaining the operation of an output-data processing control unit in the first embodiment of the present invention.

FIG. 13: Operation of Output-Data Processing Control Unit 22

Referring next to FIG. 13, a description will be given of the operation of the output-data processing control unit 22. The basic operation of the output-data processing control unit 22 is similar to the above-described operation of the input-data processing control unit 21, but its operation differs in that the reading and the like of data on the read side is carried out.

The output-data processing control unit 22 starts with Step S299, and first waits for the arrival of an input/output command from the multiprocessing control unit 20 in Step S300. Namely, a check is made as to whether or not there has been an input/output command, and if NO is the answer, the operation returns to Step S300 to loop until the arrival of the input/output command. Upon arrival of the input/output command, the operation proceeds to Step S301.

In Step S301, the value of the flag F which is sent together with the input/output command is checked. Here, if the IGNCLS bit is on, the operation proceeds to Step S302, and if the bit is not on, the operation jumps to Step S305.

In Step S302, a check is made as to whether or not the input/output command is a close command. If it is the close command, the operation jumps to Step S305, and if it is not, the operation proceeds to Step S303 to set the end state as a normal end (OK). Then, in Step S304, the multiprocessing control unit 20 is notified of the end. Upon completion of Step S304, the operation returns to Step S300 to wait for the delivery of an input/output command from the multiprocessing control unit 20.

In Step S305, the internal flag FLAG is initialized.

Then, the operation proceeds to Step S306 to check whether or not the JSEND bit is on in the flag F sent from the multiprocessing control unit 20. Here, if the JSEND bit is on (this indicates that processing which exceeds a prescribed time is being carried out in the execution of the job step; refer to Steps S117 to S120 in FIG. 9), the operation proceeds to Step S307 to check whether or not the read-side processing is being carried out by the sort processing device 4. If YES is the answer in the determination, the present processing is executed in Step S309 without interrupting the processing. This is because processing cannot be interrupted in the read-side sort processing until the end data is read, so that the processing needs to be continued even after exceeding the time. If NO is the answer in the determination, the operation proceeds to Step S308 to temporarily interrupt the processing, and the JSEND bit is set to notify the end of the job step (finally, the multiprocessing control unit 20 is notified of the end of the job step in Step S317). Then, the operation proceeds to Step S310.

In Step S309, the designated processing, such as sort, combination, and merge, is executed by the database processing device 3 and the sort processing device 4.

At this time, since requests for a multiplicity of processing operations are issued in mixed form, a plurality of programs in a number corresponding to the jobs are installed in the database processing device 3, and the database processing device 3 executes processing by invoking a program corresponding to a designated job among the programs. In the database processing device 3 having a configuration shown in FIG. 19, for example, the multiplicity of programs corresponding to jobs are stored in the main storage devices 36 and 37, and are executed by the microprocessors 34 and 35.

There are cases where data are inputted up to a limit of the capacity of the sort processing device 4 in the execution, with the result that a end of a job step and an end of a job are transmitted. In that case, in Step S309, JSEND, JBEND, and JSEND are set in FLAG to end the processing.

Here, a job step ends in the following cases:
1) When the sort processing device 4 is used:
   Read side: in a case where data is read from the sort processing device 4 up to the end data
2) When the sort processing device 4 is not used:
   Read side: in a case where the xfer command is executed a plurality of times, and a fixed time is reached Among these cases, when the sort processing device 4 is used, the read side ends the job step by itself when the data and the end data written by the the input-data processing control unit 21 is read by the output-data processing control unit 22 in an ensuing job step.

Thus, data strings which are inputted from the host computer are divided according to the capacity of the sort processing device or a designated time, and divided data substrings come to be present in mixed form over jobs, thereby carrying out multiprocessing.

In Step S309, it is assumed that in the case where a job step is ended on the read side in case 1) of the above-described cases, JSEND is set in the on state, thereby ending the job step. Further, if processing is that of a close command, JBEND is also set, thereby ending the job step.

Upon completion of the processing in Step S309, a determination is made in Step S310 as to whether or not an error has occurred in the course of processing. If the error has occurred, JSEND and ERR bits are set in FLAG in Step S311, and the operation proceeds to Step S312. Meanwhile, if no error occurred, the operation jumps directly to Step S312.

Next, in Step S312, if the input/output command is the close command, and processing thereof is being carried out, the JBEND bit and the CAN bit are set in FLAG in Step S313, and the operation proceeds to Step S314. Meanwhile, if the answer is determined to be NO in Step S312, the operation jumps directly to Step S314.

In Step S314, a check is made as to whether or not the ERR or CAN bit is on. If YES is the answer, a check is made in Step S315 as to whether or not a job step using the sort processing device 4 is being executed. If the answer is determined to be YES in Step S315, the operation proceeds to Step S316 to discard data in the sort processing device 4 until the end word appears. Upon completion of discarding, the operation proceeds to an ensuing Step S317.

On the other hand, if the answer is determined to be NO in Step S314 or S315, the operation jumps to Step S317 without discarding the data.

Finally, in Step S317, the FLAGs which were set in the above Steps S305 to 316 are outputted to the multiprocessing control unit 20 to notify the end state.

Then, the operation returns to Step S300 to wait for an ensuing input/output command.

Example of Operation of Multiple-Processing Control

Figure 14:
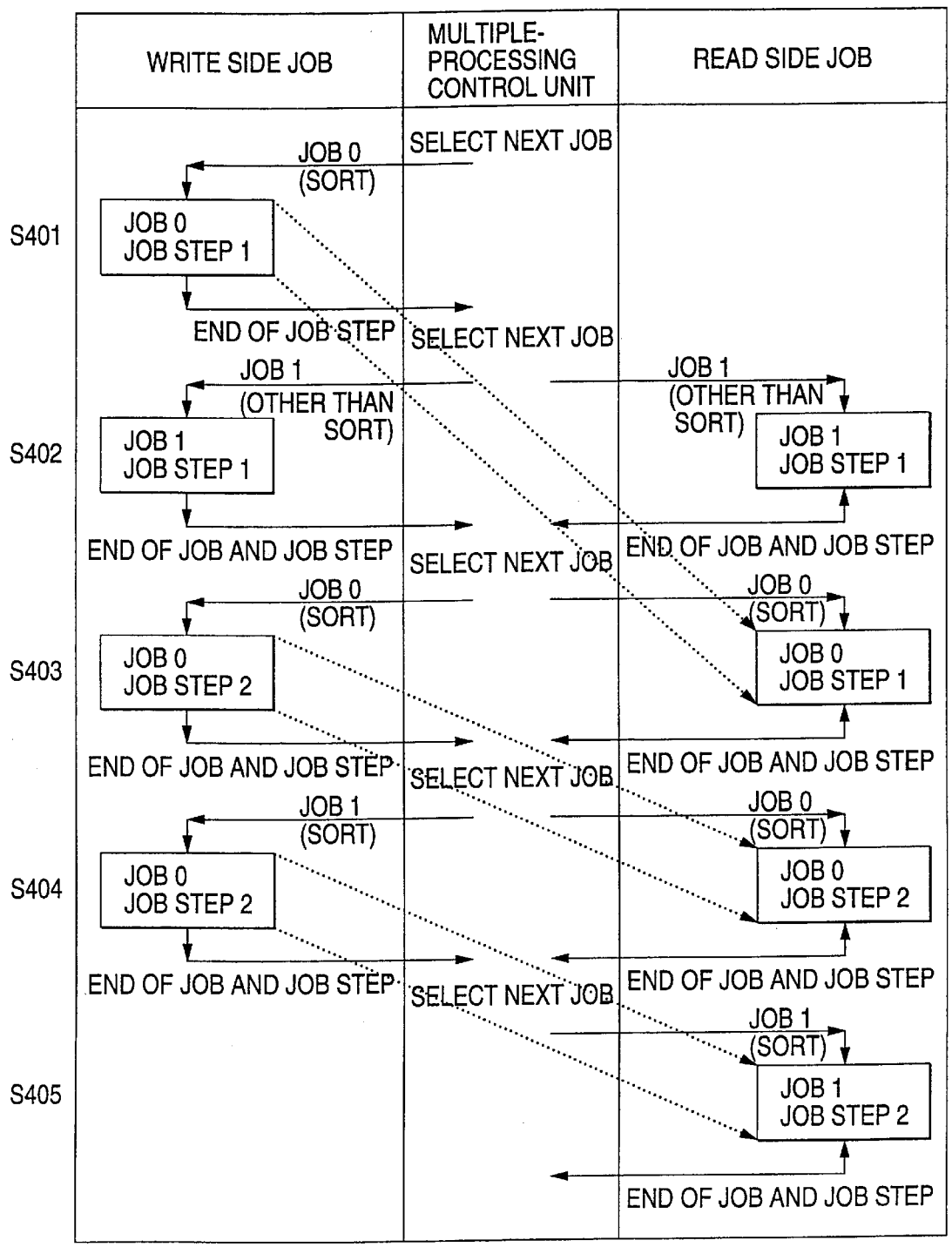
FIG. 14 is a diagram explaining input/output timings of job steps in a case where jobs using the sort processing device and jobs not using the same are processed in parallel.

An example of control which is effected in accordance with the above-described procedure is shown in FIG. 14.
Step S401

In FIG. 14, the job 0 which uses the sort processing device 4 is first started. This is effected as the multiprocessing control unit 20 delivers an input/output command to the input-data processing control unit 21, and the input-data processing control unit 21 upon receiving the same executes the job step 1 of the job 0 (at this time both the database processing device 3 and the sort processing device 4 which are controlled by the input-data processing control unit 21 also effect the processing of the job step 1). Upon completion of this execution, the input-data processing control unit 21 notifies JSEND to the multiprocessing control unit 20, informing that the job step 1 of the job 0 is completed. At this time, although the processing of the job 0 is completed as the job step 1, the processing of the job 0 still continues as a job.
Step S402

Next, the multiprocessing control unit 20 cyclically selects a write-side job. The multiprocessing control unit 20 sets the job 1 as the write-side job, and delivers an input/output command to the input-data processing control unit 21. Here, it is assumed that the type of processing of the job 1 is processing other than sort processing. In this case, the multiprocessing control unit 20 is started by setting the job 1 as the read-side job as well, and delivers an input-data processing control unit to the output-data processing control unit 22.

Upon completion of the job 1, the input-data processing control unit 21 and the output-data processing control unit 22 notifies the multiprocessing control unit 20 of JBEND.

(In addition, the operation differs in a case where the processing time of the job step 1 of the job 1 exceeds MAXTIME, and the multiprocessing control unit 20 notifies the input-data processing control unit 21 and the output-data processing control unit 22 of JSEND. Upon receipt of this notification, the input-data processing control unit 21 and the output-data processing control unit 22 temporarily ends the processing of the job step 1 of the job 1.)

Step S403

Next, the multiprocessing control unit 20 cyclically selects again the job 0 as the write-side job, and gives an instruction to execute an ensuing job step 2. Meanwhile, the job step 1 of the job 0, the data of which was inputted to the sort processing device 4 immediately before and remained therein, is allocated to the read side.

Step S404

When the job step 1 of the job 0, which was being executed on the write side, ends such as in a case where the data inputted to the sort processing device 4 has reached a limit of the capacity or the processing time has reached MAXTIME, the multiprocessing control unit 20 cyclically selects a job again and allocates it to the write side. Here, it is assumed that a new job 1 which uses the sort processing device 4 is allocated.

Meanwhile, when end data is detected in the data transmitted from the sort processing device 4, the job step 1 of the job 0 on the read side ends. Similarly, the job step 2 of the job 0, the data of which was inputted to the sort processing device 4 immediately before and remained therein, is allocated to the read side.

Then, the job step 2 of the job 1 allocated to the write side and the job step 0 of the job 0 allocated to the read side are executed and end.

Step S405

If new input/output commands have not arrived at the queues 55 to 59 in FIG. 2, and there is no job step which was being temporarily suspended, no new job is allocated to the write side, and the job step 2 of the job 1 is allocated to only the read side.

Sort Processing Device 4

Figure 15:
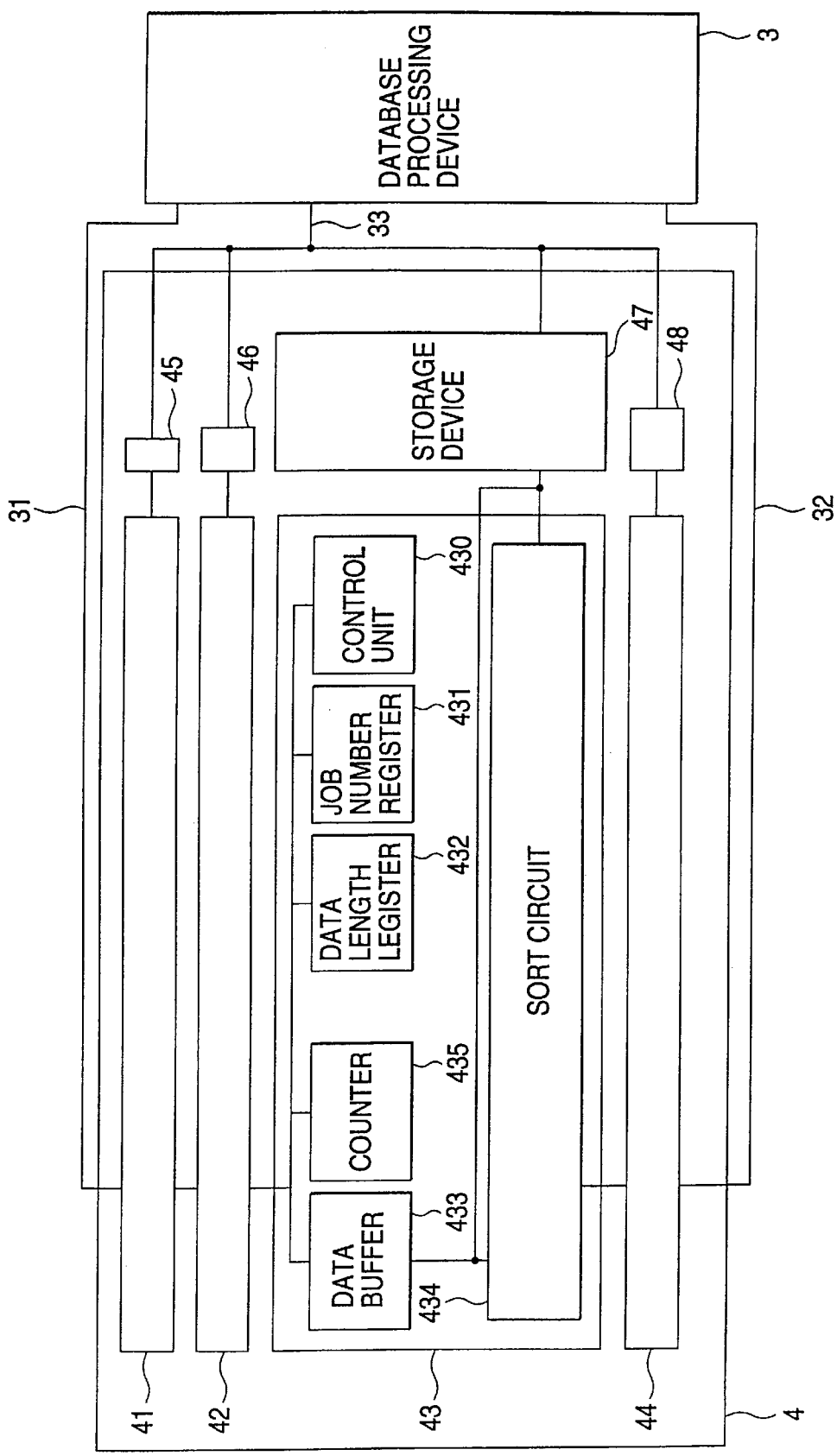
FIG. 15 is a functional block diagram illustrating in detail the sort processing device in the first embodiment of the present invention.

Next, a description will be given of the configuration of the sort processing device for realizing multiprocessing. FIG. 15 shows the configuration of a sort processor constituting the sort processing device 4. In FIG. 15, reference numerals which are identical to those of FIG. 2 denote identical or corresponding portions. Reference numerals 41 to 44 denote sort processors, and 45 to 48 denote storage devices connected to the sort processors 41 to 44, respectively. In FIG. 15, the inner structure of the sort processor 43 among the sort processors is shown in detail (the other sort processors 41, 42, and 44 also have structures similar thereto). Numeral 430 denotes a control unit of the sort processor; 431, a job number register for identifying the job to which the data being processed by the sort processor 43 belongs; 432, a data length register for storing the length of the data of a relevant job; 433, a data buffer for temporarily storing data inputted to the sort processor 43 from the sort processor 42 in the preceding stage; 434, a sort circuit for sorting; and 435, a counter indicating the number of bytes of the data to be sorted which remains in the sort processor.

The sort processing device 4 is connected to a database processing device 30 via connecting lines 31 and 32. The storage devices 45 to 48 in the sort processing device 4 are connected to the database processing device 3 by a connecting line 33 so that the storage devices 45 to 48 also function as main storage devices of the database processing device 3. Access from the database processing device via the connecting line 33 is possible when the sort processing device 4 is stopped.

Figure 16:
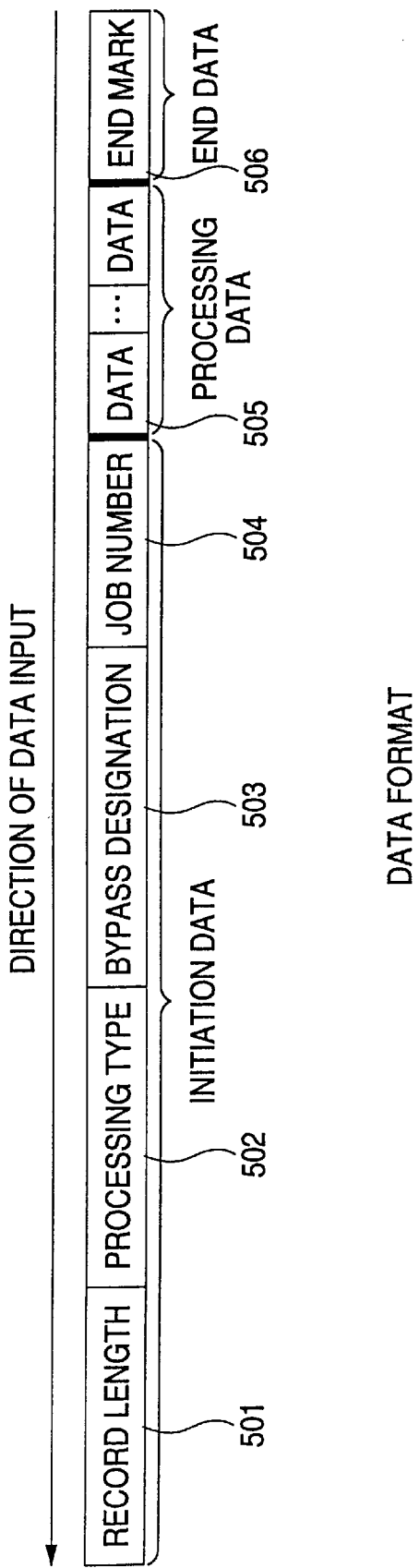
FIG. 16 is a diagram illustrating data of a job step in the first embodiment of the present invention.

In addition, FIG. 16 shows the format of data inputted to the sort processing device 4. This data is provided for each job step, and is inputted and outputted in the order of initialization data, processing data, and end data.

First, the initialization data is comprised of a record length 501 indicating the length of the record; a processing type 502 indicating the type of processing such as "sort processing" or "other than sort processing"; a bypass designation 503 having a plurality of bits respectively corresponding to the sort processors 41 to 44 and instructing that processing by the sort processor corresponding to an off bit will not be carried out when the bit is off; and a job number 504 for identifying the job.

The processing data is a data portion which is subject to processing. Finally, the end data, i.e., an end mark, represents an end of the job step which is added in the input-data processing control unit 21.

As described so far, the sort processing device 4 executes a plurality of processing operations continuously on a time-sharing basis. At this time, the length of data subject to processing varies depending on the processing operation. For this reason, as shown in FIG. 16, the initialization data is inputted prior to the data at the time of starting a job step, and the end data is added to the end of the data at the end of the job step.

Before describing the operation of the sort processing device 4 in this first embodiment, a description will be first given of problems occurring when multiprocessing is carried out by the sort processing device 4 and of a method of solving the same in accordance with the present invention.

Method of Multiplexing Sort Processing and Processing Other Than Sort

1) The sort processing device 4 is used not only for sort processing as described above, but the storage devices 45 to 48 in the sort processing device 4 are also used as shared memory for the database processing device 3. Now, a case is considered in which a sequence of operation is carried out as follows: Sort processing is interrupted at a job step boundary, the operation proceeds to merge processing by the database processing device 3, and sort processing is then resumed. In this case, it is necessary that the contents of the storage devices 45 to 48 which were executing the job step of sort processing be kept in a state which permits the resumption of sort processing after completion of merge processing, without being affected by the execution of the job step of the database processing device 3 executed after temporarily interrupting the sort processing. For this reason, it is necessary to effect processing in which the data remaining in the sort processing device 4 is temporarily outputted to a disk device 8 or the like shown in FIG. 2 as a file, the data is inputted again to the sort processing device 4 after completion of the processing by the database processing device 3 so as to resume processing. Hence, there is a problem in that the processing performance declines substantially.

In the present invention, the following method is adopted so as to execute merge processing and sort processing in parallel without causing a decline in the processing speed.

FIGS. 17A to 17D are diagrams explaining the state of use of the storage devices 45 to 48 in the sort processing device 4. In FIGS. 17A to 17D, the same reference numerals as those used in FIG. 15 designate identical or corresponding parts.

Figure 17A:
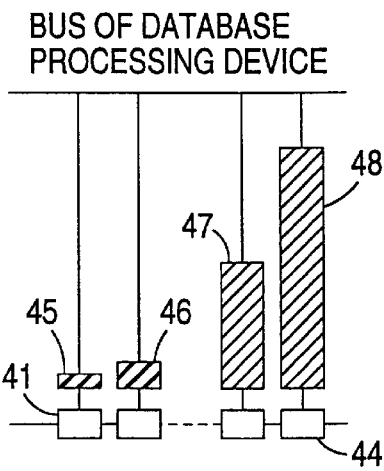
FIGS. 17A to 17D are diagrams illustrating storage areas used by a database processing device and the sort processing device in a case where a storage device is shared by the two devices.

FIG. 17A shows a case in which the storage devices 45 to 48 are used only in sort processing. In FIG. 17A, hatched portions indicate that areas in the storage devices 45 to 48 are being used for sort processing. Thus, all the areas are used for sort processing.

Figure 17B:
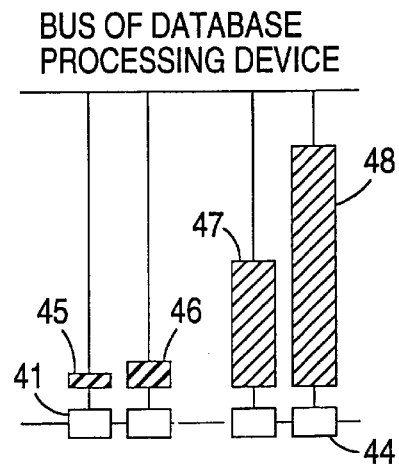

FIG. 17B shows a case in which the storage devices 45 to 48 are used only in processing other than sort processing, such as merge processing. In FIG. 17B, hatched portions indicate that areas in the storage devices 45 to 48 are being used by the database processing device 3. Thus, all the areas are used for processing other than sort processing.

Figure 17C:
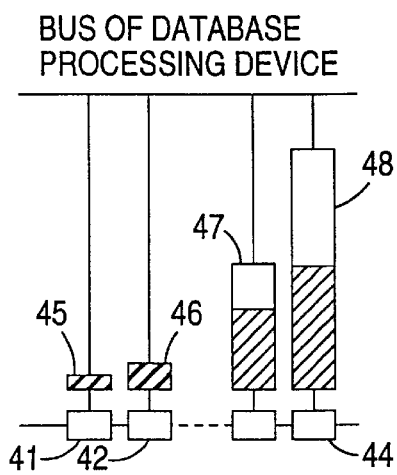

In FIG. 17C, hatched portions indicate areas which are used for sort processing in a case where sort processing and processing other than sort processing, such as merge processing, are executed with two degrees of multiprocessing.

Figure 17D:
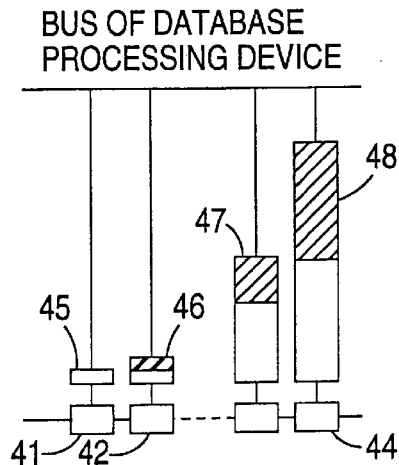

In FIG. 17D, in the same way as FIG. 17C, hatched portions indicate areas which are used for processing other than sort processing in the case where sort processing and processing other than sort processing, such as merge processing, are executed with the two degrees of multiprocessing.

In the case of FIGS. 17C and 17D, the first-stage sort processor 41 is bypassed without being used. This is effected as the bit corresponding to the first-stage sort processor 41 of the bypass designation 503 of the data shown in FIG. 16 is set in the off state. As a relevant sort processor is bypassed, the storage capacity necessary for that sort processor can be reduced. For this reason, as can be seen from FIGS. 17C and 17D, areas which are used in sort processing and processing other than sort processing are clearly separated and do not overlap, so that it is unnecessary to save the data on the disk device 8 or the like. Hence, sort processing and processing other than sort processing can be switched over speedily.

As shown in FIGS. 17A–17D, as the first stage is bypassed, i.e., skipped, during multiprocessing, only lower halves of the storage devices 45 to 48 in the sort processing device 4 are used. As is apparent from the operation of the sort processing device 4, if the leading sort processor 41 of the sort processing device 4 is bypassed, and the second-stage sort processor 42 is used as a leading processor, the second-stage sort processor 42 uses its own storage device only by a portion necessary for the first-stage sort processor 41. For example, if the first stage is not bypassed, the second-stage sort processor sorts data sorted in units of two records which are sent from the first-stage sort processor. For this reason, the second-stage sort processor effects processing in which the second-stage sort processor stores in its own storage device 45 the first two records which are first sent thereto, and makes a comparison between a leading record of the set of two records subsequently sent thereto and a leading record of the set of two records stored therein. In general, an ith-stage sort processor first stores in its own storage device already sorted $2^{i-1}$ records which are sent thereto from a preceding stage, and effects the merge processing of the same with already sorted $2^{i-1}$ records which are subsequently sent thereto. Thus, the ith-stage sort processor generates a string of sorted records consisting of $2^i$ records, and sends it to a subsequent stage. Accordingly, if the second stage is used as a leading sort processor, the memory which is used by that sort processor is equal to a one-record portion, and the storage capacity used by an ith-sort processor generally amounts to a $2^{i-2}$ record portion. Hence, it can be seen that the capacity used is halved. In view of this fact, as for each of the sort processors 45 to 48, a lower half below a predetermined address can be used as memory for the sort processor, and an upper half can be used for shared memory for the database processing device 3.

Although in the above-described arrangement the first-stage sort processor 41 is bypassed, a midway sort processor may be bypassed, or the final-stage sort processor 44 may be bypassed. If the final-stage sort processor 44 is bypassed, the structure of the sort processing device 4 becomes complex, but since all the memory area of the storage device 48 can be used for processing other than sort processing, there is an advantage in that a continuous storage area can be secured. (The reason for this is that the capacity of the storage device in the sort processing device 4 becomes larger toward a later stage.)

Check of Sort Processing

2) In a case where merge processing or the like is executed by the database processing device 3, it is necessary to confirm that the data received from the sort processing device 4 has been properly sorted, and that the merged data is also in a sorted state. If the sort processors are used in this confirmation processing, the sorted order of the input data can be easily confirmed, but the sort processors 41 to 44 cannot be used for storing the remaining data during multiprocessing. Therefore, the database processing device 3 needs to perform execution by itself. Consequently, there has been a problem in that the load on the database processing device 3 becomes high, and the performance of the database processing device 3 deteriorates.

In the first embodiment of the present invention, this problem is solved in the following manner to permit high-speed processing.

As described in 1) above, in cases where sort processing and processing other than sort processing are executed by multiprocessing, the first-stage sort processor 41 of the sort processing device 4 is set in an unused state. By using this first-stage sort processor 41, it is possible to perform a check as to whether or not the received data has been properly sorted and the merged data is in a sorted state. In the case of one degree of multiprocessing, during merge processing, the sort processing device remains stopped and its storage devices are empty. Hence, the first-stage sort processor and the first-stage memory are always empty, so that there is no problem in using them.

When a check is made as to whether or not a data string subject to operation by the database processing device 3 has been sorted, initialization data in which a value for designating an ascending/descending order check is written in the processing type 502 is prepared, and this initialization data is allowed to flow to the sort processing device 4 at the start of a job step. This data stream is interpreted by the first-stage sort processor 41, and the first-stage sort processor 41 is set in a mode for checking the ascending/descending order.

Subsequently, data for checking the ascending/descending order is transferred to the first-stage sort processor 41. In this transfer, data which are stored in the storage devices 45 to 48 in the sort processing device 4 are transferred to the storage device 45 of the first-stage sort processor 41 at high speed by using an unillustrated direct memory access controller (DMAC).

Alternatively, data such as the one shown in FIG. 16 is prepared, a check of the ascending/descending order is written in the processing type 502, and the data is transferred via a normal route.

Upon receipt of the data, the first-stage sort processor 41 performs a check of the ascending/descending order of this data.

The configuration provided is such that if the arrangement of the transferred data is not proper and is not properly sorted, an error signal is outputted from the first-stage sort processor to the database processing device 3 or the controller 2. By receiving this signal, the database processing device 3 or the controller 2 is capable of confirming whether or not sort processing has been effected properly.

3) In a case where an attempt is made to simultaneously complete job steps on the write side and the read side, there is a possibility that data at the leading end and trailing end of a record respectively lie outside both sides of the sort processor 4. Namely, the following problems can occur:

Even if processing is stopped at a record boundary on the write side, the job step cannot be finished on the read side since the record lies outside the read side (the pipeline constituted by the entire sort processing device is stopped unless data is further written on the write side).

Even if processing is stopped at a record boundary on the read side, the job step cannot be finished on the write side since the record lies outside the read side (the pipeline constituted by the entire sort processing device is stopped unless data is further read on the read side).

In such cases, processing cannot be stopped on the side where the record lies outside, so that the job step cannot be finished. In the sort processing device 4, even if the sort processors 41 to 44 do not effect sort processing, input data is temporarily fetched to its own storage devices 45 to 48, and is subsequently outputted consecutively to the subsequent-stage sort processors, so as to allow a final record at the job step boundary to be unfailingly fetched to the sort processing device 4. Namely, even in the case where data is simply bypassed, the sort processors 41 to 44 temporarily fetch into the storage devices 45 to 48 even the data which cannot be accommodated in the data buffers, and the sort processors 41 to 44 send the data to the subsequent stages in due course of time.

Hereafter, a description will be given of the operation of the sort processing device 4 for realizing the above-described function.

Each of the sort processors 41 to 44 first stores in its data buffer 433 the data which is inputted from a preceding stage or the preceding-stage sort processor. Then, the control unit 430 checks the type of data in the data buffer 433.

1) If the data in the data buffer 433 is the initialization data, the following operation is carried out.

a) The counter 435 is checked. If the counter 435 is not set to 0, the operation waits until the counter 435 is set to 0, i.e., until the data remaining in the storage device 47 is outputted to the final-stage sort processor 44.

b) If the counter 435 is set to 0, the job number and the record length in the initialization data are stored in the respective internal registers 431 and 432.

c) Then, the processing type 502 in the initialization data is referred to.

c-1) If Sort Type 502 is Sorting

A discrimination is made as to whether or not the bit corresponding to the relevant sort processor is on in the bypass designation in the initialization data. For example, in the case of an ith-stage sort processor, a check is made as to whether or not an ith bit from the leading end in the bypass designation 503 shown in FIG. 16 is on.

c-1-1) If this bit is on, the sort circuit 434 is initialized such that subsequently inputted data is stored in the respective storage devices 41 to 44, and is then transferred directly to subsequent-stage sort processors without effecting sorting while bypassing the relevant sort processors.

c-1-2) If this bit is not on, the sort circuit 434 is initialized to further effect sort processing.

c-2) If Sort Type 502 is Sort Order Check

The sort circuit 434 is set to an ascending/descending order check. In the case of a check on whether data is arranged in an ascending order, for example, the ascending order check can be easily realized as an error is reported to the sort circuit 434 if the data inputted earlier is not larger than the data inputted subsequently in the result of comparison, instead of outputting data to a subsequent-stage sort processor as a result of comparison in sort processing.

2) If data is present in the data buffer 433, the data is sent to the sort circuit 434, and a designation for execution of sorting, an ascending/descending order check, or bypassing is given.

For example, if sort processing is effected, first, when data is sent from a preceding-stage sort processor (e.g., sort processor 42) to the data buffer 433, all the initial data block already sorted by the preceding-stage sort processor is stored in the storage device 47. (If bypassing is not effected, the amount of this data stored in the case of the ith-stage sort processor is 2 to the (i–1)th power. For example, in the third-stage sort processor 43, a four-record portion is stored.)

Next, data at a leading end of the second data block which is sent from the preceding-stage sort processor is sent to the data buffer. This data is sent to the sort circuit 434. Upon receiving this data, the sort circuit 434 reads the initial data of the data block stored in the storage device 47, and compares that data and the data sent from the data buffer 433. If the data in the data buffer 433 is larger, this data is sent to a subsequent-stage sort processor. If the data in the sort circuit 434 is larger, the data in the sort circuit 434 is sent to the subsequent-stage sort processor, and the sort circuit 434 reads data to be compared next from the storage device 47. Then, the sort circuit 434 repeats the operation in which after making a comparison between the data thus read and the data read from the data buffer 433, the larger data is sent to the subsequent-stage sort processor.

3) If the data in the buffer is end data, in the case of sort processing, an instruction is given for sorting the remaining data to the sort circuit 434, and an instruction is given thereto to send its result to the subsequent-stage sort processor. In the case of the processing of an ascending/descending order check, an instruction is given to perform the ascending/descending order check with respect to the remaining data.

Further, in the above-described embodiment, in a case where the number of degrees of multiprocessing is changed from 2 to 1, a change is made in such a manner as to process only the job 0. Namely, if input/output commands sent from the CPU 7 to units other than the units 0, 1, and 2, i.e., units 3 and 4, are present in the multiprocessing control unit 20, this state is immediately reported to the CPU 7 as an error. Consequently, processing with respect to the units 1 and 2 is always set as being subject to processing without changing the processing flow shown in FIG. 8, thereby making it possible to change the number of degrees of multiprocessing.

Since the present invention is configured as described above, the present invention offers the following advantages.

As described above, the sorting method in accordance with the present invention comprises the steps of: separating as a data-block separating step a first data block consisting of a plurality of records into a plurality of first small data blocks each including a plurality of records; sorting as a first sorting step the plurality of records included in each of the plurality of first small data blocks by a sort processing unit; sorting as a second sorting step a plurality of records included in a second data block different from the first data block by the sort processing unit; sorting by the sort processing unit as a third sorting step the first small data block not sorted in the first sorting step; and generating as a data-block merging step a sorted data block by merging the plurality of first small data blocks sorted in the first sorting step and the third sorting step. Therefore, in operation, as compared with a case where the entire first data block is sorted, the first sorting step is finished in a short time, and the second sorting step is then executed. After completion of the second sorting step, the third sorting step for sorting the first data block again is executed in a short time. Accordingly, by using one sort processing unit, the second data block can be sorted while the first data block is being sorted, with the result that the throughput of the system improves.

As described above, the sort processing device in accordance with the present invention comprises: a first multiple-input control unit which accepts a plurality of sort processing operations, and outputs sort data concerning one of the sort processing operations under a predetermined processing condition, and after completion of the outputting thereof sort data concerning another one of the sort processing operations; a sort processing unit for sorting the sort data sent thereto from the first multiple-input control unit; and a multiple-output control unit for collectively outputting data for each sort processing operation by discriminating which sort processing operation the sort data sent from the sort processing unit concerns. Accordingly, in operation, the first multiple-input control unit outputs data by changing over the plurality of sort processing operations under a predetermined condition, the sort processing unit receives and sorts the data, and the multiple-output control unit outputs the sorted data sent from the sort processing unit separately for each sort processing operation. Therefore, a plurality of sort processing operations can be executed in parallel by one sort processing unit.

In addition, the first multiple-input control unit outputs the sort data concerning a part of one sort processing operation among the plurality of sort processing operations for a predetermined time duration, and after completion of the outputting thereof outputs the sort data concerning a part of another sort processing operation for a predetermined time duration. Accordingly, the first multiple-input control unit outputs data by changing over the plurality of sort processing operations in the predetermined time, the sort processing unit receives and sorts the data, and the multiple-output control unit outputs the sorted data sent from the sort processing unit separately for each sort processing operation. Therefore, a plurality of sort processing operations can be executed in parallel by one sort processing unit.

In addition, the first multiple-input control unit outputs a predetermined data amount of the sort data concerning a part of one sort processing operation among the plurality of sort processing operations, and after completion of the outputting thereof outputs a predetermined data amount of the sort data concerning a part of another sort processing operation. Accordingly, data concerning one sort processing operation is divided into fixed sizes to generate small data blocks, and the data is outputted while the plurality of sort processing operations are changed over for each small data block. Therefore, a plurality of sort processing operations can be executed in parallel by one sort processing unit.

In addition, the first multiple-input control unit accepts the plurality of sort processing operations, outputs the sort data concerning one sort processing operation until one of a condition that the sort data is outputted for a predetermined time duration and a condition that a predetermined data amount of the sort data is outputted is satisfied, and after completion of the outputting thereof outputs the sort data concerning another sort processing operation until one of a condition that the sort data is outputted for a predetermined time duration and a condition that a predetermined data amount of the sort data is outputted is satisfied. Accordingly, data of not more than a fixed amount is outputted to the sort processing unit, and the sort processing operation is changed over for each fixed time. Therefore, a plurality of sort processing operations can be executed by being divided at least after the lapse of each fixed processing time, and the data can be sent within the scope of the amount of data which can be handled by the sort processing unit.

In addition, when a shift is made from one sort processing operation to another sort processing operation, the sort processing unit stores all the records of the sort data concerning the part of one sort processing operation outputted by the first multiple-input control unit. Therefore, the sort processing operation is not changed over before all the data of one small data block is inputted to the sort processing unit. Consequently, one small data block can be sorted completely by the sort processing unit.

In addition, the first multiple-input control unit is capable of variably setting a maximum number of the sort processing operations which the first multiple-input control unit accepts. Therefore, the first multiple-input control unit accepts processing within the scope which does not exceed the upper limit, and outputs the accepted data for processing to the sort processing unit. Hence, by using one sort processing unit, it is possible to attain both high-speed processing of a large amount of data if the maximum number is set to a low level and a high throughput of a plurality of sort processing operations if the maximum number is set to a high level, thereby making it possible to reduce cost as compared with a case where a plurality of sort processing units are used.

In addition, when outputting the sort data concerning the sort processing operation, the first multiple-input control unit outputs the sort data with end data added thereto if an error or cancellation concerning the sort processing operation is detected, and the first multiple-input control unit suspends the sort processing operation, while the multiple-output control unit reads up to the end data the sort data concerning the sort processing operation from the sort processing unit. Accordingly, upon detecting an error or cancellation, the first multiple-input control unit outputs the sort data with the end data added thereto without outputting the remaining of the sort data being outputted, and suspends the sort processing operation. To remove the sort data concerning the suspended sort processing operation from the sort processing unit, the multiple-output control unit processes another normal sort processing operation without resetting the data concerning the suspended sort processing operation together with the sort data concerning another normal sort processing operation remaining in the sort processing unit. Meanwhile, the multiple-output control unit reads the sort data concerning the suspended sort processing operation remaining in the sort processing unit, to ensure that the data does not remain in the sort processing unit. Hence, even if an error or cancellation occurs, other sort processing operations which are being executed in parallel can be effected properly.

As described above, the data processing apparatus in accordance with the present invention comprises: a second multiple-input control unit which accepts a sort processing operation and a database processing operation, outputs sort data concerning the sort processing operation under a predetermined processing condition, and after the outputting thereof outputs data concerning the database processing operation under a predetermined processing condition; a sort processing unit constituted by a plurality of sort processors connected in series, and adapted to sort the sort data sent thereto from the second multiple-input control unit; a database processing unit for performing the database processing operation with respect to the data sent thereto from the second multiple-input control unit; and a multiple-output control unit which collectively outputs the sort data sent thereto from the sort processing unit or the data sent thereto from the database processing unit for each of the sort processing operation and the database processing operation by discriminating whether the data sent to the multiple-output control unit is the data concerning the sort processing operation or the database processing operation. Accordingly, the second multiple-input control unit outputs the sort data concerning the sort processing operation and the data concerning the database processing operation by changing them over under a predetermined condition, and the multiple-output control unit outputs the sort data and the data separately for each processing type by discriminating between the sort data and the data. Hence, sort processing and database processing can be executed in parallel by using one data processing apparatus.

In addition, as described above, the data processing apparatus further comprises: a shared storage section connected to the sort processing unit and the database processing unit, to allow the database processing unit to use storage memory which is not used for sort processing as at least one of the plurality of sort processors is bypassed. Accordingly, part of the storage memory of the sort processors is used for the database processing unit, and the remaining storage memory is used for sort processing, such that data concerning both database processing and sort processing are stored simultaneously, thereby using the storage memory in such a manner as not to cause mutual interference to the data. Therefore, while sort processing is being carried out, it is unnecessary to save the data located in the sort processing unit in an external storage device, and sort processing and database processing can be executed in parallel at high speed.

In addition, the second multiple-input control unit outputs the sort data concerning the part of the sort processing operation for a predetermined time duration, and after the outputting thereof outputs the data concerning the part of the database processing operation for a predetermined time duration. Accordingly, the second multiple-input control unit outputs the sort data concerning the sort processing operation and the data concerning the database processing operation by changing them over in the predetermined time, and the multiple-output control unit outputs the sort data and the data separately for each processing type by discriminating between the sort data and the data. Hence, sort processing and database processing can be executed in parallel by using one data processing apparatus.

In addition, the second multiple-input control unit accepts a sort processing operation and a database processing operation, outputs a predetermined data amount of the sort data concerning the sort processing operation, and after the outputting thereof outputs a predetermined data amount of the data concerning the database processing operation. Therefore, after outputting a predetermined data mount of the sort data, the second multiple-input control unit outputs data concerning the database processing operation. Hence, sort processing and database processing can be executed in parallel.

In addition, the second multiple-input control unit accepts a sort processing operation and a database processing operation, outputs the sort data concerning the sort processing operation until one of a condition that the sort data is outputted for a predetermined time duration and a condition that a predetermined data amount of the sort data is outputted is satisfied, and after the outputting thereof outputs the data concerning the database processing operation for a predetermined time duration. Accordingly, sort processing and database processing can be executed in parallel by one data processing apparatus, and data which are inputted in the fixed time can be changed over. At the same time, the sort data can be sent within the range of the amount of data which can be handled by the sort processing device.

In addition, since at least one of the sort processors is used for an ascending/descending order check, the ascending/descending order check is performed by using at least one sort processor. When sort processing is carried out, the sort processor which effects the ascending/descending order check is bypassed, and the other sort processors execute the sort processing operation. Thus, the sort processor which effects the ascending/descending order check does not interfere with the contents stored in the other sort processors, while the other processors do not interfere with the contents stored in the processor which effects the ascending/descending order check. Hence, the ascending/descending order check and the sort processing can be executed by one sort processing unit, and a changeover can be easily effected between the ascending/descending order check and the sort processing.

In addition, the second multiple-input control unit is capable of variably setting a maximum number of the sort processing operations and the database processing operations other than the sort processing operations which the second multiple-input control unit accepts. Consequently, the second multiple-input control unit accepts processing within the scope which does not exceed the upper limit, and outputs the accepted data for processing to the sort processing unit or the database processing unit. Hence, by using one sort processing unit or one database processing unit, it is possible to attain both high-speed processing of a large amount of data if the maximum number is set to a low level and a high throughput of a plurality of sort processing operations or processing operations other than sort processing operations if the maximum number is set to a high level, thereby making it possible to reduce cost as compared with a case where a plurality of sort processing units or a plurality of database processing units are used.

While some specific embodiments have been described, it should be understood that the present invention is not limited to those embodiments, but may variously be modified, altered and changed within the scope of the present invention.

What is claimed is:

1. A sorting method comprising:
   separating a first data block including a first plurality of records into a plurality of smaller data blocks, each smaller data block including a respective portion of the first plurality of records;
   in a first sequential sorting step, in a first stage of a multiple stage sort processing unit, beginning sorting of the portion of the first plurality of records included in a first smaller data block of the plurality of smaller data blocks;
   in a second sequential sorting step, in the first stage of the sort processing unit, beginning sorting of a second plurality of records included in a second data block, different from the first data block, while simultaneously sorting to completion in a later stage of the sort processing unit the portion of the first plurality of records included in the first smaller data block of the plurality of smaller data blocks;
   in a third sequential sorting step, in the first stage of the sort processing unit, beginning sorting of the portion of the first plurality of records included in a second smaller data block of the plurality of smaller data blocks while simultaneously sorting to completion in the later stage of the sort processing unit the second plurality of records included in the second data block;

in a fourth sequential sorting step, in the later stage of the sort processing unit, sorting to completion the portion of the first plurality of records included in the second smaller data block of the plurality of smaller data blocks; and merging the portions of the first plurality of records included in the first and second smaller data blocks to generate a first sorted data block.

2. A sort processing device comprising:

a multiple input control unit for receiving a plurality of sort processing operations and outputting sequentially interspersed data blocks from a first plurality of data blocks for a first sort processing operation and a second plurality of data blocks for a second sort processing operation, wherein each data block includes a plurality of records;

a sort processing unit that receives the sequentially interspersed data blocks output from said multiple input control unit, sequentially sorts, and sequentially outputs sorted data blocks; and a multiple output control unit that correlates, merges, and outputs sorted data blocks corresponding to each sort processing operation.

3. The sort processing device of claim 2, wherein said multiple input control unit outputs a first set of data blocks for the first sort processing operation during a first time period, and, after outputting the first set of data blocks for the first sort processing operation, outputs data blocks for the second sort processing operation during a second time period, and, after outputting the data blocks for the second sort processing operation, outputs a second set of data blocks for the first sort processing operation.

4. The sort processing device of claim 2, wherein said multiple input control unit outputs a first set of data blocks for the first sort processing until a first quantity of data is output, and, after outputting the first set of data blocks for the first sort processing operation, outputs data for the second sort processing operation until a second quantity of data is output, and, after outputting the data blocks for the second sort processing operation, outputs a second set of data blocks for the first sort processing operation.

5. The sort processing device of claim 2, wherein said multiple input control unit outputs a first set of data blocks for the first sort processing until either a first quantity of data is output or a first time period has elapsed, and, after outputting the first set of data blocks for the first sort processing operation, outputs data for the second sort processing operation until either a second quantity of data or a second time period has elapsed, and, after outputting the data blocks for the second sort processing operation, outputs a second set of data blocks for the first sort processing operation.

6. The sort processing device of claim 2, wherein said sort processing unit stores all the data blocks previously output by said multiple-input control unit when said multiple-input control unit shifts from the first sort processing operation to the second sort processing operation.

7. The sort processing device of claim 2, wherein said multiple-input control unit variably sets a maximum number of the sort processing operations that said multiple-input control unit can receive.

8. The sort processing device of claim 2, wherein, when outputting the data blocks for the first sort processing operation, said multiple-input control unit outputs a data block with end data added thereto if one of an error and a cancellation for the first sort processing operation is detected, and said multiple-input control unit suspends outputting additional data blocks from the first sort processing operation while said multiple-output control unit continues to read and store data blocks for the first processing operation until the end data is received.

9. The sort processing device of claim 2, wherein said multiple-input control unit outputs the data blocks with identifying data added thereto for correlating, merging, and outputting sorted data blocks corresponding to each sort processing operation.

10. A sort processing apparatus comprising:

a multiple input control unit receiving a sort processing operation and a database processing operation different from the sort processing operation, outputting sequentially interspersed data from a plurality of data blocks for the sort processing operation and a plurality of parts for the database processing operation wherein each data block is a plurality of records for a portion of the sort processing operation and each part is a portion of data from the database processing operation;

a sort processing unit including a plurality of sort processors connected in series for sorting the data blocks received from said multiple input control unit;

a database processing unit for performing the database processing operation with respect to the parts sent from said multiple input control unit;

a shared storage section including a plurality of storage components equal in number to said sort processors, wherein each storage component corresponds to and is accessed by a respective one of said plurality of sort processors, each of the plurality of sort processors communicating only with the respective storage component, said database processing unit communicating with the plurality of storage components, and said database processing unit may use any of the plurality of storage components not used for sort processing; and a multiple output control unit that correlates, merges, and outputs sorted data blocks and parts corresponding to each sort processing operation and each database processing operation.

11. The data processing apparatus of claim 10, wherein said multiple input control unit outputs a first set of data blocks for the sort processing operation during a first time period, and, after outputting the first set of data blocks for the sort processing operation, outputs a set of parts of the database operation during a second time period, and, after outputting the set of parts of the database operation, outputs a second set of data blocks for the first sort processing operation.

12. The data processing apparatus of claim 10, wherein said multiple input control unit outputs a first set of data blocks for the sort processing operation until a first quantity of data is output, and, after outputting the first set of data blocks for the sort processing operation, outputs a set of parts of the database operation until a second quantity of data is output, and, after outputting the set of parts of the database operation, outputs a second set of data blocks for the first sort processing operation.

13. The data processing apparatus of claim 10, wherein said multiple input control unit outputs a first set of data blocks for the sort processing operation until either a first quantity of data is output or a first time period has elapsed, and, after outputting the first set of data blocks for the sort processing operation, outputs a set of parts of the database operation until either a second quantity of data is output or a second time period has elapsed, and, after outputting the set of parts of the database operation, outputs a second set of data blocks for the first sort processing operation.

14. The data processing apparatus of claim 10, wherein at least one of the plurality of sort processors verifies that the data blocks have been sorted in one of ascending and descending order.

15. The data processing apparatus of claim 10, wherein said multiple-input control unit sets a maximum number of sort processing operations and database processing operations that said multiple input control unit receives.

16. A sorting method comprising:

(a) receiving a plurality of sort processing operations;

(b) separating each of the plurality of sort processing operations into a plurality of small data blocks, wherein each small data block includes a portion of a plurality of records contained in a sort processing operation;

(c) outputting a first set of small data blocks, among the plurality of small data blocks, of a first sort processing operation under a first criterion;

(d) after the first set of small data blocks among the plurality of small data blocks of the first sort processing operation have been output, outputting a first set of small data, blocks among the plurality of small data blocks, of a second sort processing operation under a second criterion;

(e) after the first set of small data blocks among the plurality of small data blocks of the second sort processing operation have been output, outputting a second set of small data blocks among the plurality of small data blocks of the first sort processing operation;

(f) in a sort processing unit with multiple stages, receiving the sets of small data blocks and, in a pipelined sequence, sorting to completion each of the sets of small data blocks as received; and (g) collecting, merging, and outputting sorted data corresponding to each sort processing operation of the plurality of sort processing operations.

17. The sorting method of claim 16 wherein identifying data is attached to the sets of small data blocks, the identifying data identifying the sort processing operation to which the sets of small data blocks correspond.

18. The sort processing method of claim 16, wherein the first criterion is a first time period and the second criterion is a second time period.

19. The sort processing method of claim 16, wherein the first criterion is a first quantity of data and the second criterion is a second quantity of data.

20. The sort processing method of claim 16 wherein an end data is added to a set of small data blocks if one of an error and a cancellation for the sort processing operation corresponding to the small data block is detected, and (f) is suspended upon the detection of the end data, and including reading, up to the end data, the set of data blocks for which the end data has been detected.

* * * * *